(12) United States Patent
Sasaki et al.

(10) Patent No.: US 8,614,932 B1
(45) Date of Patent: Dec. 24, 2013

(54) THERMALLY-ASSISTED MAGNETIC RECORDING HEAD HAVING A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/621,532

(22) Filed: Sep. 17, 2012

(51) Int. Cl.
*G11B 11/00* (2006.01)

(52) U.S. Cl.
USPC ..................................... 369/13.17; 369/13.33

(58) Field of Classification Search
USPC ......... 369/13.02, 13.13, 13.17, 13.33; 360/59
See application file for complete search history.

(56) References Cited

U.S. PATENT DOCUMENTS

| | | | |
|---|---|---|---|
| 7,068,453 B2 | 6/2006 | Terris et al. | |
| 7,710,677 B2* | 5/2010 | Tanaka et al. | 360/59 |
| 8,000,178 B2* | 8/2011 | Shimazawa et al. | 369/13.33 |
| 8,107,325 B2* | 1/2012 | Komura et al. | 369/13.33 |
| 8,116,034 B2* | 2/2012 | Komura et al. | 360/125.31 |
| 8,130,598 B2* | 3/2012 | Matsumoto et al. | 369/13.33 |
| 8,164,986 B2* | 4/2012 | Aoki et al. | 369/13.01 |
| 8,169,731 B2* | 5/2012 | Mizuno et al. | 360/59 |
| 8,194,509 B2* | 6/2012 | Shimazawa et al. | 369/13.33 |
| 8,248,890 B2* | 8/2012 | Komura et al. | 369/13.02 |
| 8,248,894 B2* | 8/2012 | Sasaki et al. | 369/13.33 |
| 2010/0284252 A1* | 11/2010 | Hirata et al. | 369/13.33 |
| 2011/0058272 A1 | 3/2011 | Miyauchi et al. | |

* cited by examiner

*Primary Examiner* — Brenda Bernardi
(74) *Attorney, Agent, or Firm* — Oliff & Berridge, PLC

(57) ABSTRACT

A plasmon generator has a near-field light generating part located between an end face of a main pole located in a medium facing surface and an end face of a shield located in the medium facing surface. A waveguide has a core having a front end face facing toward the medium facing surface. The front end face has first and second end portions located at opposite ends in the direction of travel of a recording medium. The first end portion is located closer to the near-field light generating part than is the second end portion. Either a main pole or a shield overlaps only a region of the front end face of the core when viewed in a direction perpendicular to the medium facing surface, the region extending from a midpoint position between the first and second end portions to the first end portion.

9 Claims, 38 Drawing Sheets

THERMALLY-ASSISTED MAGNETIC RECORDING HEAD HAVING A PLASMON GENERATOR

BACKGROUND OF THE INVENTION

1. Field of the Invention

The present invention relates to a thermally-assisted magnetic recording head for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the recording medium. The slider has a medium facing surface that faces the recording medium. The medium facing surface has an air inflow end (a leading end) and an air outflow end (a trailing end).

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

U.S. Pat. No. 7,068,453 B2 discloses a thermally-assisted magnetic recording head that employs an electrically resistive heater as a means for heating a recording medium. However, it is difficult for this head to heat only a minute region of the recording medium, and thus the recording density thereof can be increased with difficulty.

For thermally-assisted magnetic recording, a known method for heating only a minute region of a recording medium is to use near-field light. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0058272 A1 discloses a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head section includes a main pole, which produces a write magnetic field, and the plasmon generator. The main pole has an end face located in the medium facing surface. The plasmon generator has a near-field light generating part located in the medium facing surface. For the thermally-assisted magnetic recording head, it is demanded that the end face of the main pole and the near-field light generating part of the plasmon generator be located in close proximity to each other.

To increase the linear recording density of a magnetic recording device, it is effective to use a perpendicular magnetic recording system in which the direction of magnetization of signals to be written on tracks of a recording medium is perpendicular to the plane of the recording medium. It is also effective to increase, on the tracks, the gradient of the change in write magnetic field intensity with respect to the change in position along the direction in which the tracks extend, i.e., the direction along the tracks (this gradient will hereinafter be referred to as the write field intensity gradient). These also apply to a magnetic recording device that employs thermally-assisted magnetic recording.

U.S. Patent Application Publication No. 2011/0058272 A1 discloses a technology for increasing the write field intensity gradient by providing a bottom shield on the leading side of the main pole, the bottom shield having an end face located in the medium facing surface. In the thermally-assisted magnetic recording head disclosed in this publication, however, there is a relatively large distance between the end face of the bottom shield and the end face of the main pole in the medium facing surface because the core and the plasmon generator are interposed between the bottom shield and the main pole. This thermally-assisted magnetic recording head therefore has a disadvantage in that it is difficult for the bottom shield to exert its function satisfactorily.

OBJECT AND SUMMARY OF THE INVENTION

It is an object of the present invention to provide a thermally-assisted magnetic recording head including a main pole, a plasmon generator, a waveguide and a shield, the thermally-assisted magnetic recording head being capable of providing increased linear recording density.

A thermally-assisted magnetic recording head of a first aspect of the present invention includes: a medium facing surface that faces a recording medium; a coil; a main pole; a shield; a return path section; a waveguide; and a plasmon generator. The coil produces a magnetic field corresponding to data to be written on the recording medium. The main pole has a first end face located in the medium facing surface. The main pole allows a magnetic flux corresponding to the magnetic field produced by the coil to pass, and produces a write magnetic field for writing data on the recording medium by means of a perpendicular magnetic recording system. The shield is made of a magnetic material and has a second end face located in the medium facing surface. The return path section is made of a magnetic material and allows the magnetic flux corresponding to the magnetic field produced by the coil to pass. The return path section connects the main pole and the shield to each other so that a space through which part of the coil passes is defined by the main pole, the shield, and the return path section. The waveguide includes a core through which light propagates, and a cladding disposed around the core. The core has a front end face facing toward the medium facing surface. The plasmon generator has a near-field light generating part located in the medium facing surface and is configured so that a surface plasmon is excited on the plasmon generator based on the light propagating through the core, and the near-field light generating part generates near-field light based on the surface plasmon.

The first end face and the second end face are located at positions that are different from each other in the direction of travel of the recording medium. The near-field light generating part is located between the first end face and the second end face. The front end face of the core has a first end portion and a second end portion that are located at opposite ends in the direction of travel of the recording medium. The first end portion is located closer to the near-field light generating part than is the second end portion. When the front end face of the core is divided into two regions: a first region extending from the midpoint position between the first end portion and the second end portion to the first end portion; and a second region extending from the midpoint position to the second end portion, one of the main pole and the shield overlaps only the first region of the front end face of the core when viewed in a direction perpendicular to the medium facing surface. As used herein, the midpoint position between the first end portion and the second end portion refers to the position that is located between the first end portion and the second end portion and is away from the first end portion by ½ the distance between the first end portion and the second end portion.

In the thermally-assisted magnetic recording head of the first aspect of the present invention, one of the main pole and the shield may have at least one non-overlapping portion that is located on an outward side of the front end face of the core in the track width direction when viewed in the direction perpendicular to the medium facing surface. In this case, the return path section may be connected to the at least one non-overlapping portion. The at least one non-overlapping portion may be two non-overlapping portions that are located on opposite sides of the front end face of the core in the track width direction when viewed in the direction perpendicular to the medium facing surface.

In the thermally-assisted magnetic recording head of the first aspect of the present invention, one of the main pole and the shield may have first and second portions that overlap the first region when viewed in the direction perpendicular to the medium facing surface. The first and second portions are located on opposite sides of the track-widthwise center of the first region. Each of the first and second portions may have a length that is in the direction perpendicular to the medium facing surface and that increases with increasing distance from the track-widthwise center of the first region.

In the thermally-assisted magnetic recording head of the first aspect of the present invention, the first end face and the second end face may be at a distance in the range of 50 to 300 nm from each other. This distance may be in the range of 50 to 100 nm.

In the thermally-assisted magnetic recording head of the first aspect of the present invention, the core may have an evanescent light generating surface that generates evanescent light based on the light propagating through the core, and the plasmon generator may have a plasmon exciting part that faces the evanescent light generating surface with a predetermined spacing therebetween. In this case, in the plasmon generator, a surface plasmon is excited on the plasmon exciting part through coupling with the evanescent light generated from the evanescent light generating surface, the surface plasmon propagates to the near-field light generating part, and the near-field light generating part generates near-field light based on the surface plasmon.

A thermally-assisted magnetic recording head of a second aspect of the present invention includes: a medium facing surface that faces a recording medium; a coil; a main pole; a waveguide; and a plasmon generator. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The waveguide includes a core through which light propagates, and a cladding disposed around the core. The core has a front end face facing toward the medium facing surface. The plasmon generator has a near-field light generating part located in the medium facing surface and is configured so that a surface plasmon is excited on the plasmon generator based on the light propagating through the core, and the near-field light generating part generates near-field light based on the surface plasmon.

The front end face of the core has a first end portion and a second end portion that are located at opposite ends in the direction of travel of the recording medium. The first end portion is located closer to the near-field light generating part than is the second end portion. When the front end face of the core is divided into two regions: a first region extending from the midpoint position between the first end portion and the second end portion to the first end portion; and a second region extending from the midpoint position to the second end portion, the main pole overlaps only the first region of the front end face of the core when viewed in a direction perpendicular to the medium facing surface.

In the thermally-assisted magnetic recording head of the second aspect of the present invention, the main pole may have first and second portions that overlap the first region when viewed in the direction perpendicular to the medium facing surface. The first and second portions are located on opposite sides of the track-widthwise center of the first region. Each of the first and second portions may have a length that is in the direction perpendicular to the medium facing surface and that increases with increasing distance from the track-widthwise center of the first region.

In the thermally-assisted magnetic recording head of the second aspect of the present invention, the core may have an evanescent light generating surface that generates evanescent light based on the light propagating through the core, and the plasmon generator may have a plasmon exciting part that faces the evanescent light generating surface with a predetermined spacing therebetween. In this case, in the plasmon generator, a surface plasmon is excited on the plasmon exciting part through coupling with the evanescent light generated from the evanescent light generating surface, the surface plasmon propagates to the near-field light generating part, and the near-field light generating part generates near-field light based on the surface plasmon.

In the thermally-assisted magnetic recording head of the first aspect of the present invention, one of the shield and the main pole overlaps only the first region of the front end face of the core when viewed in the direction perpendicular to the medium facing surface. In the thermally-assisted magnetic recording head of the second aspect of the present invention, the main pole overlaps only the first region of the front end face of the core when viewed in the direction perpendicular to the medium facing surface. These features of the thermally-assisted magnetic recording heads of the first and second aspects of the present invention make it possible to produce a write magnetic field of a large write field intensity gradient in the vicinity of the near-field light generating part, and consequently allow the improvement of linear recording density.

Other and further objects, features and advantages of the present invention will appear more fully from the following description.

DETAILED DESCRIPTION OF THE PREFERRED EMBODIMENTS

First Embodiment

Figure 1:
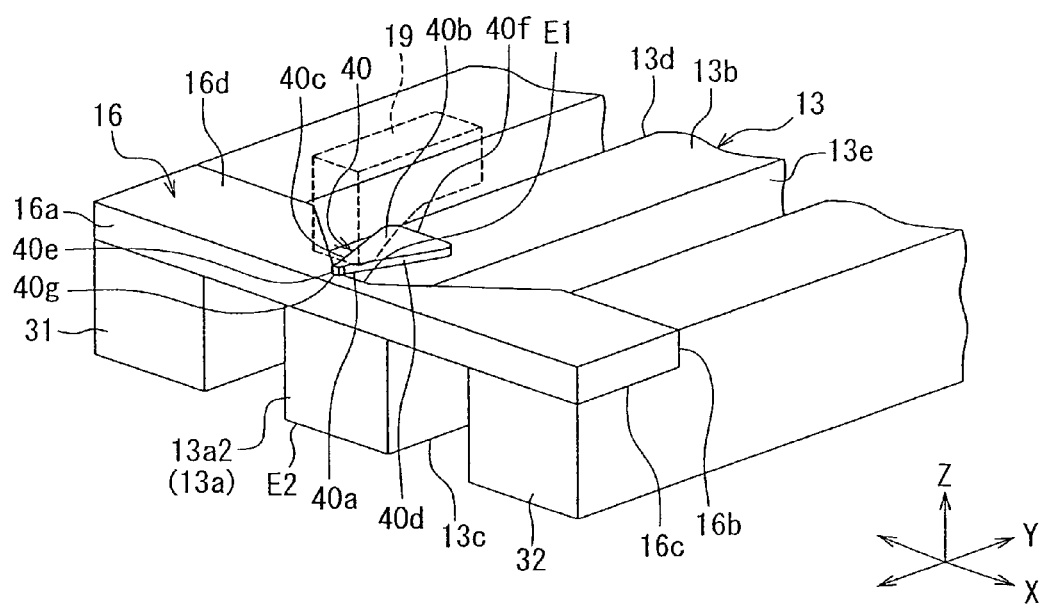
FIG. 1 is a perspective view showing the main part of a thermally-assisted magnetic recording head according to a first embodiment of the invention.
Figure 2:
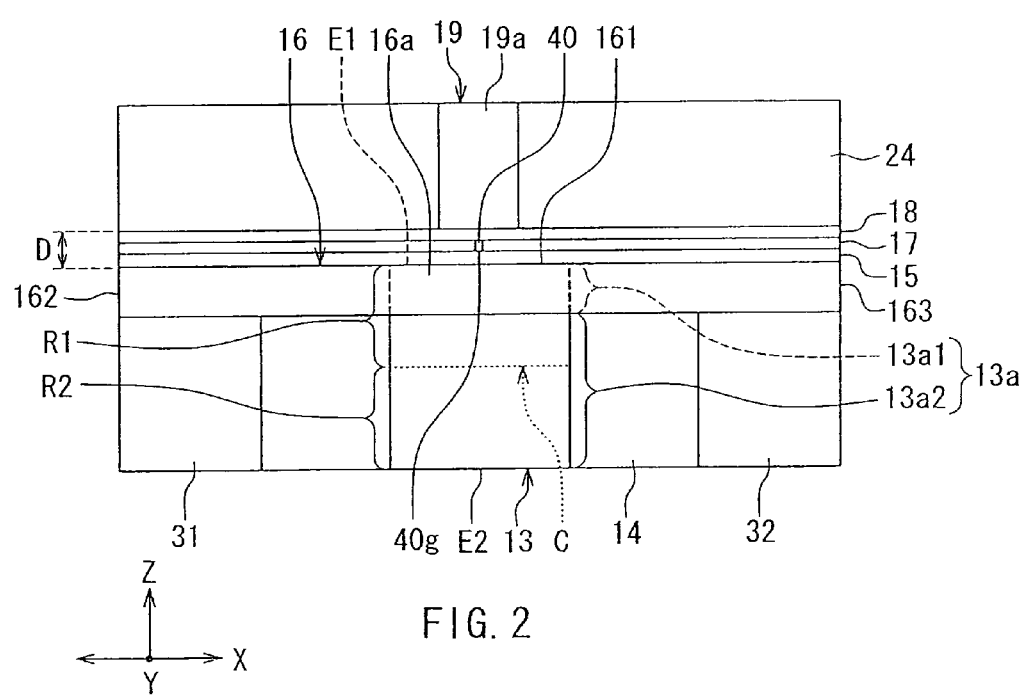
FIG. 2 is a front view showing the main part of the thermally-assisted magnetic recording head according to the first embodiment of the invention.
Figure 3:
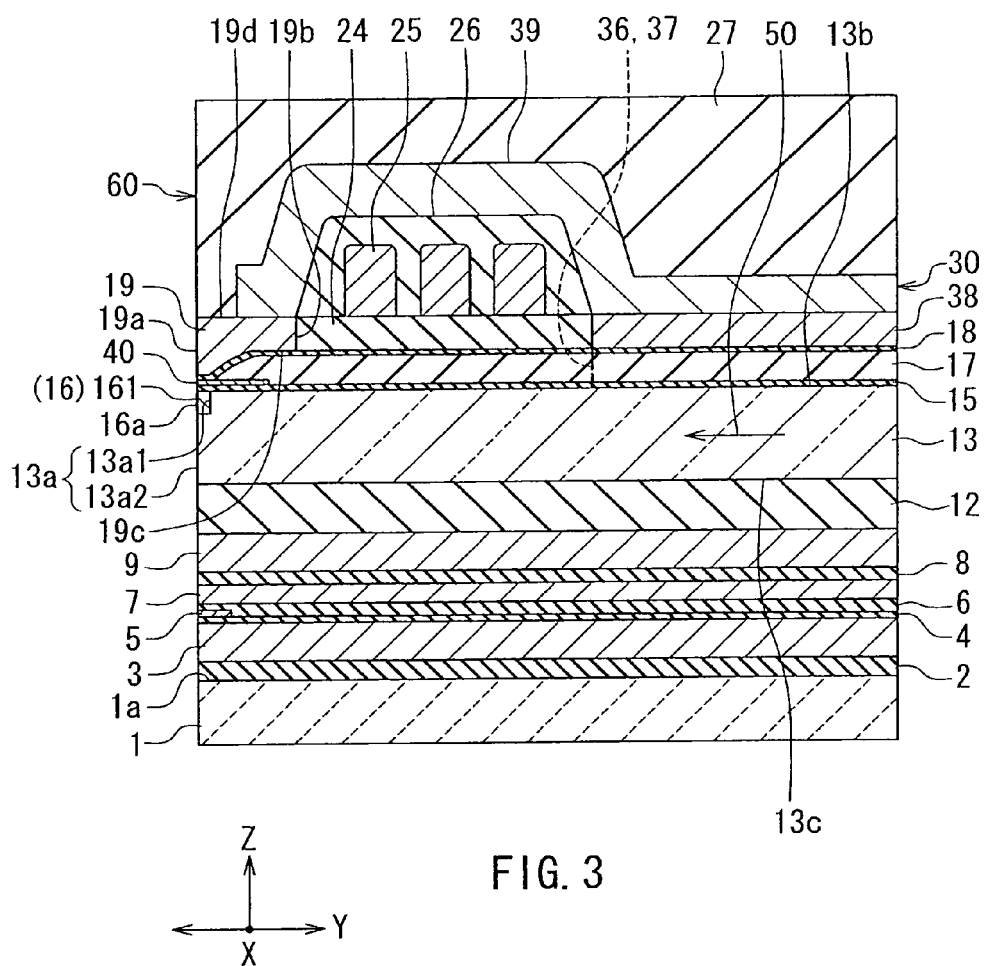
FIG. 3 is a cross-sectional view showing the configuration of the thermally-assisted magnetic recording head according to the first embodiment of the invention.
Figure 4:
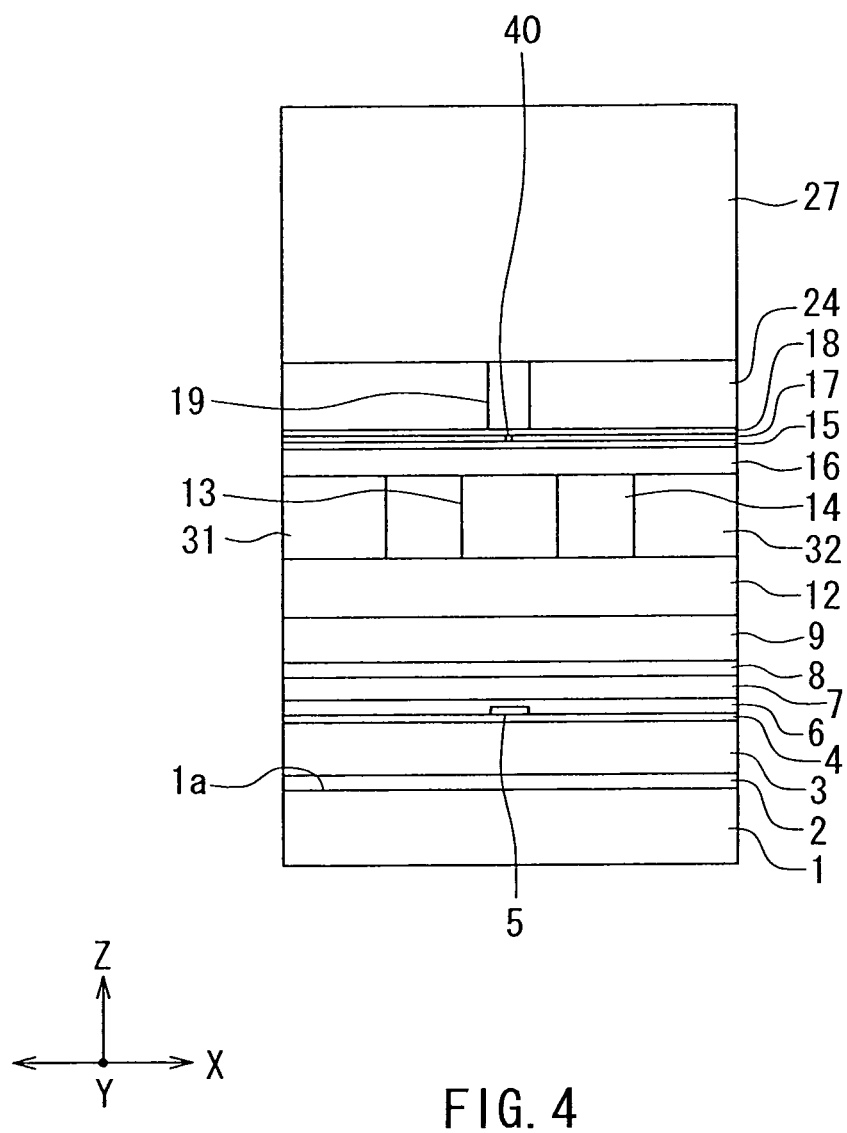
FIG. 4 is a front view showing the medium facing surface of the thermally-assisted magnetic recording head according to the first embodiment of the invention.
Figure 5:
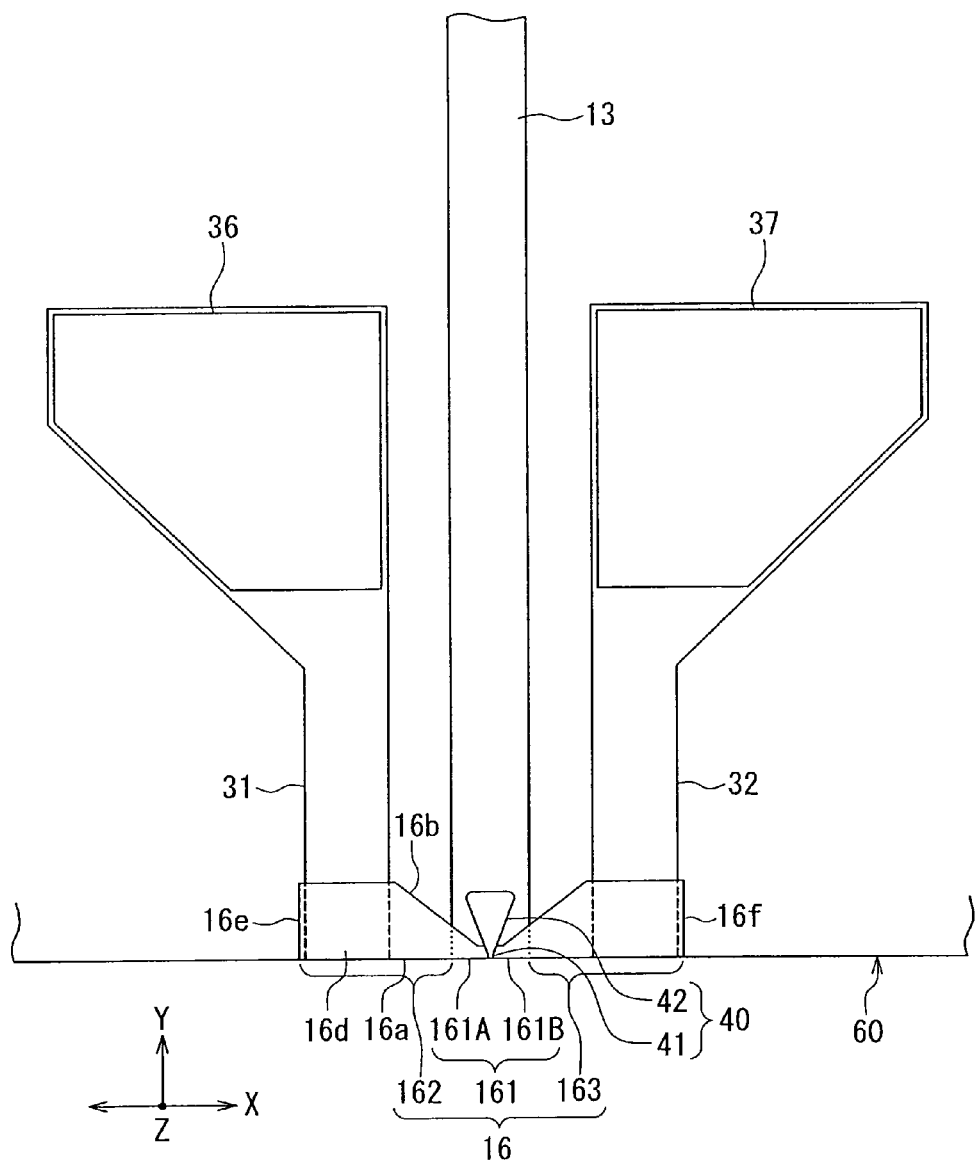
FIG. 5 is a plan view showing a part of the thermally-assisted magnetic recording head according to the first embodiment of the invention.
Figure 6:
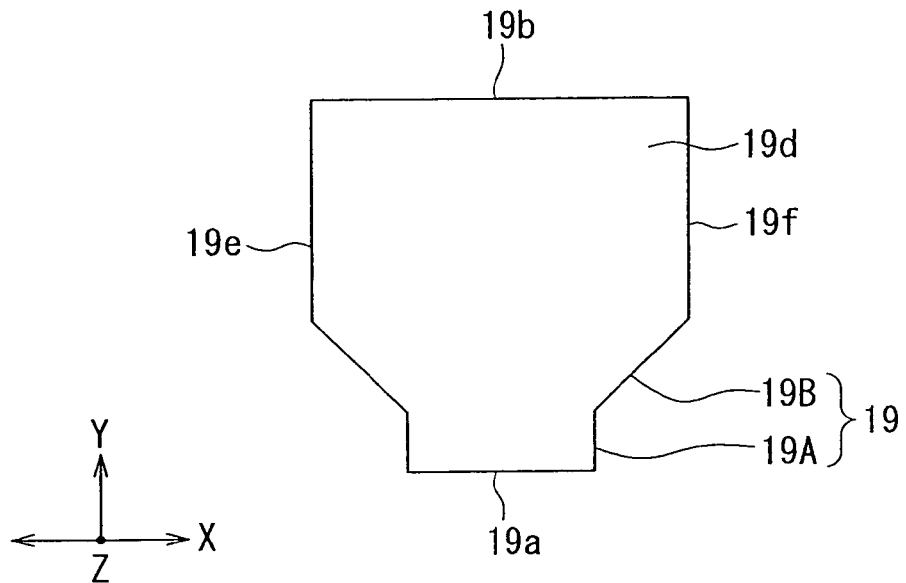
FIG. 6 is a plan view showing a first example of the main pole of the first embodiment of the invention.
Figure 7:
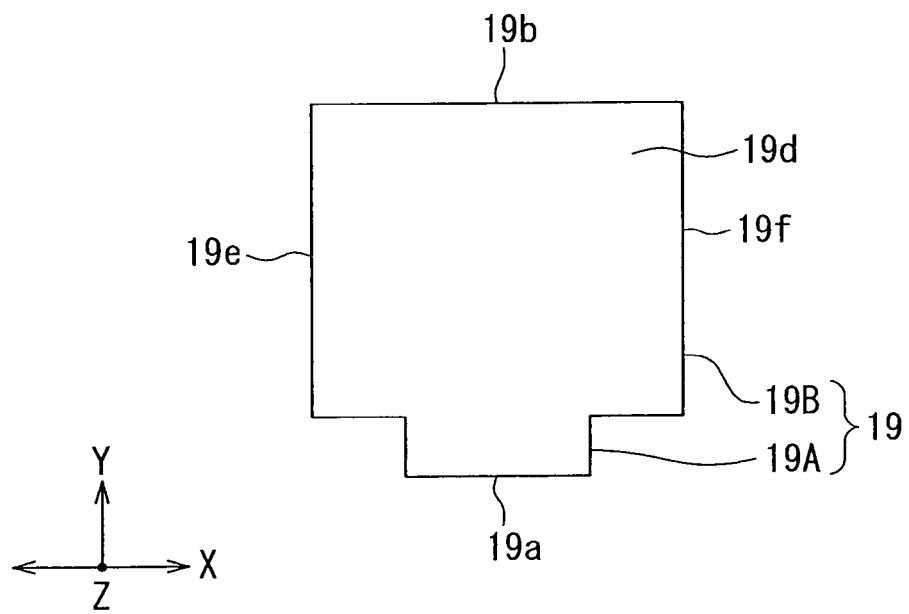
FIG. 7 is a plan view showing a second example of the main pole of the first embodiment of the invention.
Figure 8A:
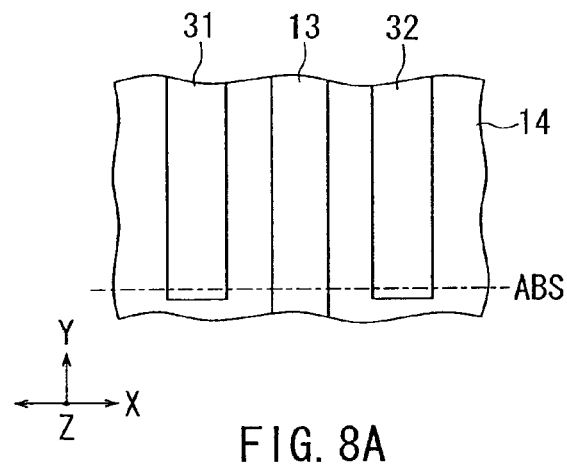
FIG. 8A to FIG. 8D are explanatory diagrams showing a step of a method of manufacturing the thermally-assisted magnetic recording head according to the first embodiment of the invention.
Figure 8B:
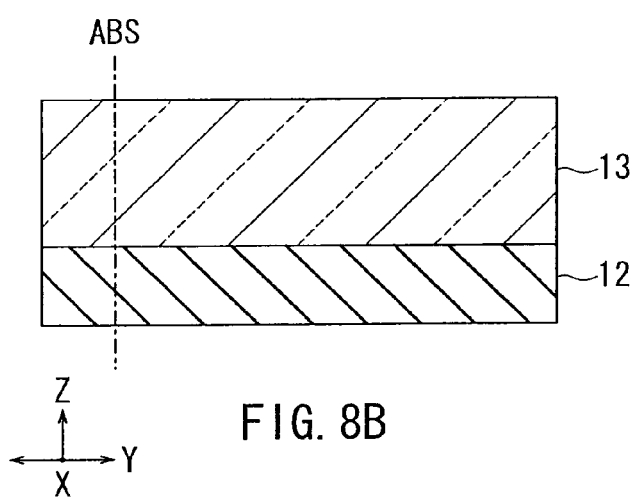
Figure 8C:
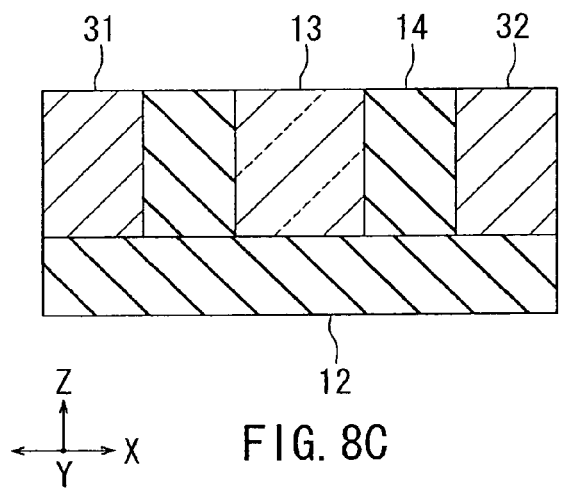
Figure 8D:
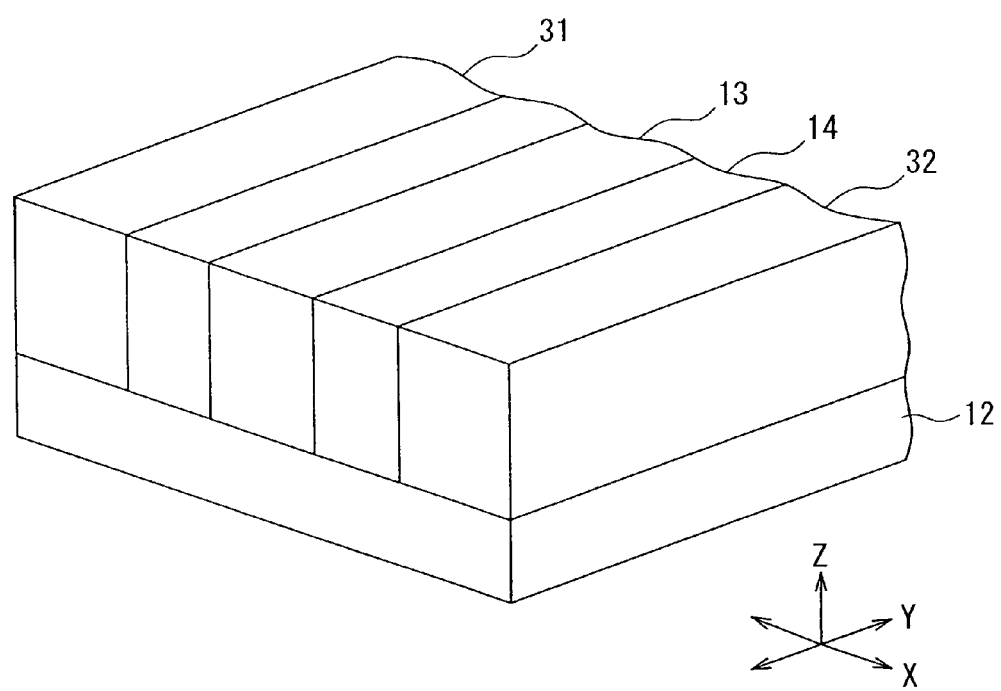

Preferred embodiments of the present invention will now be described in detail with reference to the drawings. First, reference is made to FIG. 1 to FIG. 7 to describe the configuration of a thermally-assisted magnetic recording head according to a first embodiment of the invention. FIG. 1 is a perspective view showing the main part of the thermally-assisted magnetic recording head. FIG. 2 is a front view showing the main part of the thermally-assisted magnetic recording head. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a part of the thermally-assisted magnetic recording head. FIG. 6 is a plan view showing a first example of the main pole. FIG. 7 is a plan view showing a second example of the main pole.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 that faces the recording medium. Here, X direction, Y direction, and Z direction will be defined as follows. The X direction is the direction across the tracks of the recording medium, i.e., the track width direction. The Y direction is a direction perpendicular to the medium facing surface 60. The Z direction is the direction of travel of the recording medium as viewed from the slider. The X, Y, and Z directions are orthogonal to one another.

As shown in FIG. 3 and FIG. 4, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 60 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, and a middle shield layer 9 made of a magnetic material and disposed on the insulating layer 8. The insulating layer 8 is made of alumina, for example.

The thermally-assisted magnetic recording head further includes a shield 16, a return path section 30, and a waveguide. The shield 16 and the return path section 30 are each made of a magnetic material. The return path section 30 includes coupling layers 31, 32, 36, 37, 38, and 39. The waveguide includes a core 13 through which light propagates, and a cladding disposed around the core 13. The core 13 has a front end face 13a facing toward the medium facing surface 60, an evanescent light generating surface 13b serving as a top surface, a bottom surface 13c, and two side surfaces 13d and 13e. The shield 16 is disposed in the vicinity of the front end face 13a of the core 13. The shapes and locations of the core 13 and the shield 16 will be described in detail later.

The cladding includes cladding layers 12, 14, and 15. The cladding layer 12 is located on the middle shield layer 9. The core 13 is located on the cladding layer 12. The coupling layers 31 and 32 are located on the cladding layer 12 at positions on opposite sides of the core 13 in the track width direction (the X direction) and are each spaced from the core 13. The cladding layer 14 is located on the cladding layer 12 and surrounds the core 13, the shield 16 and the coupling layers 31 and 32.

The coupling layers 31 and 32 each extend in the direction perpendicular to the medium facing surface 60 (the Y direction). In the vicinity of the medium facing surface 60, the width of each of the coupling layers 31 and 32 in the track width direction (the X direction) is constant regardless of the distance from the medium facing surface 60, whereas in the area away from the medium facing surface 60, the aforementioned width of each of the coupling layers 31 and 32 is greater than that in the medium facing surface 60. The coupling layer 36 is located away from the medium facing surface 60 and lies on the coupling layer 31. The coupling layer 37 is located away from the medium facing surface 60 and lies on the coupling layer 32. The cladding layer 15 lies over the core 13, the cladding layer 14, the shield 16 and the coupling layers 31 and 32 and surrounds the coupling layers 36 and 37.

The core 13 is made of a dielectric material that transmits laser light to be used for generating near-field light. The laser light emitted from a laser diode (not shown) enters the core 13 and propagates through the core 13. The cladding layers 12, 14, and 15 are each made of a dielectric material that has a refractive index lower than that of the core 13. For example, the core 13 may be made of tantalum oxide such as $Ta_2O_5$ or silicon oxynitride (SiON), whereas the cladding layers 12, 14, and 15 may be made of silicon dioxide ($SiO_2$) or alumina.

The thermally-assisted magnetic recording head further includes a main pole 19 disposed above the core 13 and the shield 16 in the vicinity of the medium facing surface 60, and a plasmon generator 40 interposed between the main pole 19 and each of the core 13 and the shield 16. The plasmon generator 40 is configured to excite surface plasmons on the principle to be described later. The plasmon generator 40 is made of, for example, one of Au, Ag, Al, Cu, Pd, Pt, Rh and Ir, or an alloy composed of two or more of these elements. The shapes and locations of the main pole 19 and the plasmon generator 40 will be described in detail later.

The thermally-assisted magnetic recording head further includes a dielectric layer 17 disposed to cover the cladding layer 15 and part of the plasmon generator 40, and a dielectric layer 18 disposed over the plasmon generator 40 and the dielectric layer 17. In the area away from the medium facing surface 60 and between the plasmon generator 40 and the main pole 19, the thickness (the dimension in the Z direction) of the dielectric layer 17 gradually increases with increasing distance from the medium facing surface 60 and then becomes constant.

Portions of the coupling layers 36 and 37 are embedded in the dielectric layers 17 and 18. The coupling layer 38 is disposed over the coupling layers 36 and 37 and the dielectric layer 18. The thermally-assisted magnetic recording head further includes a dielectric layer 24 disposed around the main pole 19 and the coupling layer 38. The top surfaces of the main pole 19, the coupling layer 38 and the dielectric layer 24 are even with each other. The dielectric layers 17, 18, and 24 are made of the same material as the cladding layer 12, 14, and 15.

The thermally-assisted magnetic recording head further includes a coil 25 disposed on the dielectric layer 24, and an insulating layer 26 disposed to cover the coil 25. The coupling layer 39 is disposed over the main pole 19, the insulating layer 26 and the coupling layer 38, and magnetically couples the main pole 19 and the coupling layer 38 to each other. The coil 25 is planar spiral-shaped and wound around part of the coupling layer 39 lying on the coupling layer 38. The coil 25 is made of a conductive material such as copper. The insulating layer 26 is made of alumina, for example.

The thermally-assisted magnetic recording head further includes a protective layer 27 disposed to cover the coupling layer 39. The protective layer 27 is made of alumina, for example.

The parts from the cladding layer 12 to the coupling layer 39 constitute a write head section. The coil 25 produces a magnetic field corresponding to data to be written on a recording medium. The shield 16, the return path section 30 (the coupling layers 31, 32, and 36 to 39) and the main pole 19 form a magnetic path for passing a magnetic flux corresponding to the magnetic field produced by the coil 25. The main pole 19 allows the magnetic flux corresponding to the magnetic field produced by the coil 25 to pass, and produces a write magnetic field for writing data on the recording medium by means of a perpendicular magnetic recording system.

As has been described, the thermally-assisted magnetic recording head according to the present embodiment includes the medium facing surface 60, the read head section, and the write head section. The medium facing surface 60 faces a recording medium. The read head section and the write head section are stacked on the substrate 1. The write head section is located on the front side in the direction of travel of the recording medium (the Z direction) (i.e., the trailing side) relative to the read head section.

The write head section includes the coil 25, the main pole 19, the waveguide, the shield 16, the return path section 30, and the plasmon generator 40. As shown in FIG. 3 and FIG. 4, the return path section 30 includes the coupling layers 31, 32 and 36 to 39, and connects the main pole 19 and the shield 16 to each other so that a space through which part of the coil 25 passes is defined by the main pole 19, the shield 16, and the return path section 30.

The waveguide includes the core 13 and the cladding. The cladding includes the cladding layers 12, 14, and 15. The main pole 19 is located on the front side in the direction of travel of the recording medium (the Z direction) relative to the core 13 and the shield 16. The core 13 has the front end face 13a and the evanescent light generating surface 13b. The plasmon generator 40 is disposed above the evanescent light generating surface 13b of the core 13 and the top surface of the shield 16, and is interposed between the main pole 19 and each of the core 13 and the shield 16.

The main pole 19, the shield 16, the core 13, and the plasmon generator 40 will now be described in detail. First, the shape of the plasmon generator 40 will be described with reference to FIG. 1 to FIG. 5. The plasmon generator 40 has a plasmon exciting part 40a serving as a bottom surface, a top surface 40b, two side surfaces 40c and 40d, a front end face 40e, and a rear end face 40f. The front end face 40e is located in the medium facing surface 60 and couples the plasmon exciting part 40a, the top surface 40b, and the two side surfaces 40c and 40d to each other. The front end face 40e has a near-field light generating part 40g located at the front extremity of the plasmon exciting part 40a. The near-field light generating part 40g generates near-field light on the principle to be described later. The plasmon generator 40 is rectangular, for example, in cross section parallel to the medium facing surface 60. The thickness (the dimension in the Z direction) of the plasmon generator 40 is generally constant regardless of the distance from the medium facing surface 60.

As shown in FIG. 5, the plasmon generator 40 includes a narrow portion 41 that is located in the vicinity of the medium facing surface 60 and a wide portion 42 that is located farther from the medium facing surface 60 than is the narrow portion 41. The width of the narrow portion 41 in the direction parallel to the medium facing surface 60 and to the evanescent light generating surface 13b (the X direction) may be constant regardless of the distance from the medium facing surface 60 or may decrease with increasing proximity to the medium facing surface 60. The wide portion 42 is located on a side of the narrow portion 41 farther from the front end face 40e and is coupled to the narrow portion 41. The width of the wide portion 42 in the track width direction (the X direction) is the same as that of the narrow portion 41 at the boundary between the narrow portion 41 and the wide portion 42, and is greater than that of the narrow portion 41 in the other positions.

The width (the dimension in the track width direction (the X direction)) of the front end face 40e is defined by the width of the narrow portion 41 in the medium facing surface 60. The width of the front end face 40e falls within the range of 5 to 40 nm, for example. The height (the dimension in the Z direction) of the front end face 40e is defined by the height of the narrow portion 41 in the medium facing surface 60. The height of the front end face 40e falls within the range of 5 to 40 nm, for example.

The shape of the main pole 19 will now be described with reference to FIG. 3, FIG. 6 and FIG. 7. The main pole 19 has a first end face 19a located in the medium facing surface 60, a rear end face 19b opposite to the first end face 19a, a bottom surface 19c, a top surface 19d, and two side surfaces 19e and 19f. As shown in FIG. 6 and FIG. 7, the main pole 19 includes a narrow portion 19A and a wide portion 19B. The narrow portion 19A has an end face located in the medium facing surface 60 and an end portion opposite to the end face. The wide portion 19B is connected to the end portion of the narrow portion 19A. The wide portion 19B is greater than the narrow portion 19A in width in the track width direction (the X direction).

The width of the narrow portion 19A in the track width direction is generally constant regardless of the distance from the medium facing surface 60. FIG. 6 shows a first example of the main pole 19 in which the width of the wide portion 19B in the track width direction is the same as that of the narrow portion 19A at the boundary between the narrow portion 19A and the wide portion 19B, and gradually increases with increasing distance from the medium facing surface 60, then becoming constant. FIG. 7 shows a second example of the main pole 19 in which the width of the wide portion 19B in the track width direction is generally constant regardless of the distance from the medium facing surface 60. The narrow portion 19A has a length in the range of, for example, 0 to 0.3 µm in the direction perpendicular to the medium facing surface 60 (the Y direction). Where this length is 0, there is no narrow portion 19A and thus the wide portion 19B has an end face located in the medium facing surface 60.

The shapes and locations of the shield 16 and the core 13 will now be described with reference to FIG. 1 to FIG. 3 and FIG. 5. The shield 16 has a second end face 16a located in the medium facing surface 60, a rear end face 16b opposite to the second end face 16a, a bottom surface 16c, a top surface 16d, and two side surfaces 16e and 16f. The shield 16 is shaped to be greater in dimension in the track width direction (the X direction) than in dimension in the direction perpendicular to the top surface 1a of the substrate 1 (the Z direction).

The first end face 19a of the main pole 19 and the second end face 16a of the shield 16 are located at positions that are different from each other in the direction of travel of the recording medium (the Z direction). In the present embodiment, in particular, the first end face 19a is located on the front side in the direction of travel of the recording medium relative to the second end face 16a. The near-field light generating part 40g is located between the first end face 19a and the second end face 16a. As shown in FIG. 2, the distance between the first end face 19a and the second end face 16a will be represented by reference letter D. The distance D is preferably in the range of 50 to 300 nm and more preferably in the range of 50 to 100 nm.

As shown in FIG. 2 and FIG. 3, the front end face 13a of the core 13 includes a first portion 13a1 located away from the medium facing surface 60 and a second portion 13a2 located in the medium facing surface 60. In the present embodiment, the second portion 13a2 is located on the rear side in the direction of travel of the recording medium relative to the first portion 13a1. Further, there is a difference in level between the first portion 13a1 and the second portion 13a2. Note that the front end face 13a may be entirely located away from the medium facing surface 60.

As shown in FIG. 1 and FIG. 2, the front end face 13a has a first end portion E1 and a second end portion E2 located at opposite ends in the direction of travel of the recording medium (the Z direction). The first end portion E1 is located on the front side in the direction of travel of the recording medium relative to the second end portion E2. Consequently, the first end portion E1 is located closer to the near-field light generating part 40g than is the second end portion E2. The first end portion E1 also serves as the forward end of the first portion 13a1 in the direction of travel of the recording medium. The second end portion E2 also serves the rearward end of the second portion 13a2 in the direction of travel of the recording medium.

In FIG. 2, the dotted line indicates the midpoint position between the first end portion E1 and the second end portion E2. This midpoint position will hereinafter be represented by reference letter C. Further, the front end face 13a is divided into two regions: a first region R1 extending from the midpoint position C to the first end portion E1; and a second region R2 extending from the midpoint position C to the second end portion E2. The first region R1 includes the first portion 13a1 and part of the second portion 13a2. The second region R2 includes the remainder of the second portion 13a2.

The shield 16 overlaps only the first region R1 of the front end face 13a of the core 13 when viewed in the direction perpendicular to the medium facing surface 60 (the Y direction). The shield 16 particularly overlaps only the first portion 13a1 of the first region R1. Part of the rear end face 16b of the shield 16 is opposed to the first portion 13a1. The part of the rear end face 16b may or may not be in contact with the first portion 13a1. In the latter case, part of the cladding may be interposed between the part of the rear end face 16b and the first portion 13a1.

The shield 16 includes an overlapping portion 161 which overlaps the first region R1 (the first portion 13a1) when viewed in the direction perpendicular to the medium facing surface 60, and two non-overlapping portions 162 and 163 located on opposite sides of the overlapping portion 161 in the track width direction (the X direction). In FIG. 5, the boundaries between the overlapping portion 161 and the non-overlapping portions 162 and 163 are shown by dotted lines. The overlapping portion 161 includes a first portion 161A and a second portion 161B located on opposite sides of the track-widthwise center of the first region R1. The first and second portions 161A and 161B overlap the first region R1 (the first portion 13a1) when viewed in the direction perpendicular to the medium facing surface 60. As shown in FIG. 5, each of the first and second portions 161A and 161B has a length that is in the direction perpendicular to the medium facing surface 60 and that increases with increasing distance from the track-widthwise center of the first region R1. The overlapping portion 161 may include not only the first and second portions 161A and 161B but also a third portion located between the first portion 161A and the second portion 161B. The length of the third portion in the direction perpendicular to the medium facing surface 60 is constant regardless of position in the track width direction.

The two non-overlapping portions 162 and 163 are located on opposite sides of the front end face 13a of the core 13 in the track width direction when viewed in the direction perpendicular to the medium facing surface 60. Thus, the non-overlapping portions 162 and 163 do not overlap the front end face 13a. The maximum length of each of the non-overlapping portions 162 and 163 in the direction perpendicular to the medium facing surface 60 is greater than the length of the overlapping portion 161 in the same direction. The coupling layer 31 of the return path section 30 is connected to the non-overlapping portion 162. More specifically, the coupling layer 31 is in contact with portions of the rear end face 16b and the bottom surface 16c of the shield 16 that are included in the non-overlapping portion 162. The coupling layer 32 of the return path section 30 is connected to the non-overlapping portion 163. More specifically, the coupling layer 32 is in contact with portions of the rear end face 16b and the bottom surface 16c of the shield 16 that are included in the non-overlapping portion 163.

The top surface 16d of the shield 16 and the evanescent light generating surface 13b of the core 13 are coplanar. As will be described later in relation to another embodiment, the top surface 16d and the evanescent light generating surface 13b may be located at positions that are different from each other in the direction of travel of the recording medium (the Z direction). The plasmon exciting part 40a of the plasmon generator 40 faces the top surface 16d and the evanescent light generating surface 13b and is spaced therefrom by a predetermined spacing. Part of the cladding layer 15 is interposed between the plasmon exciting part 40a and each of the top surface 16d and the evanescent light generating surface 13b.

The bottom surface 19c of the main pole 19 is opposed to a part of the top surface 40b of the plasmon generator 40 with the dielectric layers 17 and 18 interposed therebetween. The distance from the top surface 1a of the substrate 1 to an arbitrary point on a part of the bottom surface 19c increases with increasing distance from the arbitrary point to the medium facing surface 60. Consequently, the distance between the part of the bottom surface 19c and the evanescent light generating surface 13b of the core 13 increases with increasing distance from the medium facing surface 60. According to the present embodiment, it is thus possible to prevent the light propagating through the core 13 from being absorbed in part by the main pole 19 and to prevent the surface plasmons excited on the plasmon exciting part 40a from being absorbed in part by the main pole 19.

Now, the principle of generation of near-field light in the present embodiment and the principle of thermally-assisted magnetic recording using near-field light will be described in detail. Laser light emitted from a laser diode (not shown) enters the core 13. As shown in FIG. 3, the laser light 50 propagates through the core 13 toward the medium facing surface 60, and reaches the vicinity of the plasmon generator 40. The evanescent light generating surface 13b of the core 13 generates evanescent light based on the laser light 50 propagating through the core 13. More specifically, the laser light 50 is totally reflected at the evanescent light generating surface 13b, and the evanescent light generating surface 13b thereby generates evanescent light which permeates into the cladding layer 15. In the plasmon generator 40, surface plasmons are excited on the plasmon exciting part 40a through coupling with the aforementioned evanescent light. The surface plasmons propagate to the near-field light generating part 40g, and the near-field light generating part 40g generates near-field light based on the surface plasmons.

The near-field light generated from the near-field light generating part 40g is projected toward a recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 19 for data writing.

A description will now be given of the specific function and effects of the thermally-assisted magnetic recording head according to the present embodiment. In the thermally-assisted magnetic recording head according to the present embodiment, the shield 16 captures a disturbance magnetic field applied to the thermally-assisted magnetic recording head from the outside thereof. This makes it possible to prevent erroneous writing on the recording medium induced by the disturbance magnetic field intensively captured into the main pole 19. The shield 16 also functions to capture a magnetic flux that is produced from the first end face 19a of the main pole 19 and spreads in directions other than the direction perpendicular to the plane of the recording medium, and to thereby prevent the magnetic flux from reaching the recording medium. It is thereby possible to increase the write field intensity gradient. Further, the shield 16 and the return path section 30 function to allow a magnetic flux that has been produced from the first end face 19a of the main pole 19 and has magnetized the recording medium to flow back to the main pole 19.

Now, a head of a comparative example will be contemplated. The head of the comparative example is configured so that the core and the plasmon generator are interposed between the bottom shield and the main pole, as disclosed in U.S. Patent Application Publication No. 2011/0058272 A1. In the head of the comparative example, the distance between the end face of the main pole and the end face of the bottom shield in the medium facing surface is greater, by at least the thickness of the core, than the distance D between the first end face 19a of the main pole 19 and the second end face 16a of the shield 16 in the present embodiment. Accordingly, in the head of the comparative example, the bottom shield cannot exert its function satisfactorily and it is therefore difficult to increase the write field intensity gradient to increase the linear recording density.

In contrast, the present embodiment is configured so that the shield 16 overlaps only the first region R1, which is closer to the main pole 19, of the front end face 13a of the core 13 when viewed in the direction perpendicular to the medium facing surface 60. The present embodiment thus allows the first end face 19a of the main pole 19 and the second end face 16a of the shield 16 to be located closer to each other easily, compared with the head of the comparative example. More specifically, according to the present embodiment, it is possible to bring the first end face 19a and the second end face 16a into close proximity to each other easily so that the distance D falls within the range of 50 to 300 nm. Consequently, the above-described functions of shield 16 can be effectively exerted to increase the write field intensity gradient. The lower limit of the distance D (50 nm) is a distance necessary to dispose the near-field light generating part 40g between the first end face 19a and the second end face 16a. To increase the write field intensity gradient, the distance D should be as small as possible. In view of the foregoing, the distance D is preferably in the range of 50 to 300 nm and more preferably in the range of 50 to 100 nm.

In the present embodiment, the near-field light generating part 40g of the plasmon generator 40 is located in the medium facing surface 60 and lies between the first end face 19a and the second end face 16a. This makes it possible to produce a write magnetic field of a large write field intensity gradient in the vicinity of the near-field light generating part 40g. According to the present embodiment, it is thereby possible to increase the linear recording density.

Note that the head of the comparative example may be conceivably configured so that the front end face of the core is located away from the medium facing surface and the bottom shield is interposed between the front end face of the core and the medium facing surface. In this case, the bottom shield and the front end face of the core are opposed to each other over a large area. This configuration causes the light propagating through the core to pass through the front end face and enter the bottom shield to thereby cause the bottom shield to be heated and expanded. This raises the problem that the bottom shield will protrude toward the recording medium and thus readily collide with the recording medium. In order to prevent this problem, the distance between the medium facing surface and the recording medium could be increased. However, this would lead to deterioration in write characteristics such as the overwrite property or to an increase in error rate. In contrast to this, the present embodiment is configured so that the shield 16 overlaps only the first region R1 of the front end face 13a when viewed in the direction perpendicular to the medium facing surface 60. That is, the shield 16 does not exist between at least the second region R2 of the front end face 13a and the medium facing surface 60. The present embodiment thus prevents the shield 16 and the front end face 13a of the core 13 from being opposed to each other over a large area, thereby precluding the aforementioned problem.

Further, in the present embodiment, the shield 16 is shaped to be greater in dimension in the track width direction (the X direction) than in dimension in the direction perpendicular to the top surface 1a of the substrate (the Z direction). Consequently, even though the shield 16 overlaps only the first region R1 of the front end face 13a, it is possible to connect the return path section 30 to at least one of two portions of the shield 16 that are opposite in the track width direction.

To preclude the aforementioned problem with higher reliability, the region of the front end face 13a that the shield 16 overlaps when viewed in the direction perpendicular to the medium facing surface 60 may be only a region extending from a position that is closer to the first end portion E1 (excluding the first end portion E1) than is the midpoint position C to the first end portion E1. For example, the region of the front end face 13a that the shield 16 overlaps when viewed in the direction perpendicular to the medium facing surface 60 may be only a region extending from a position that is located between the first end portion E1 and the second end portion E2 and is away from the first end portion E1 by ¼ the distance between the first end portion E1 and the second end portion E2 to the first end portion E1. The present embodiment satisfies this requirement.

In the present embodiment, the shield 16 made of a magnetic metal material is disposed on the leading side of the plasmon generator 40, particularly in the vicinity of the near-field light generating part 40g. Since the top surface 16d of the shield 16 is located close to the plasmon exciting part 40a of the plasmon generator 40, surface plasmons are excited also on the top surface 16d. Then, the electric line of force produced by the surface plasmons on the plasmon exciting part 40a and the electric line of force produced by the surface plasmons on the top surface 16d of the shield 16 are coupled to each other in the vicinity of the near-field light generating part 40g. This produces a high-density electric line of force in a narrow area in the vicinity of the near-field light generating part 40g. The spread of the near-field light generated by the near-field light generating part 40g is thereby suppressed. Thus, the shield 16 of the present embodiment also has the function of suppressing the spread of near-field light. According to the present embodiment, this function of the shield 16 allows a reduction in track width, thereby allowing an increase in recording density.

Further, in the present embodiment, the overlapping portion 161 of the shield 16 includes the first and second portions 161A and 161B, and the length of each of the first and second portions 161A and 161B in the direction perpendicular to the medium facing surface 60 increases with increasing distance from the track-widthwise center of the first region R1. Consequently, the present embodiment allows the enhancement of the aforementioned function of the shield 16 while preventing magnetic flux from being saturated at some midpoint in the shield 16.

Now, a method of manufacturing the thermally-assisted magnetic recording head according to the present embodiment will be described. The method of manufacturing the thermally-assisted magnetic recording head according to the present embodiment includes the steps of; forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 60.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not shown) connected to the MR element 5 are formed on the bottom shield gap film 4. The top shield gap film 6 is then formed to cover the MR element 5 and the leads. Next, the top shield layer 7, the insulating layer 8, the middle shield layer 9, and the cladding layer 12 are formed in this order on the top shield gap film 6.

Reference is now made to FIG. 8A through FIG. 12C to describe the process of forming the shield 16 after the formation of the cladding layer 12. FIG. 8A through FIG. 12C each show a stack of layers formed in the process of manufacturing the thermally-assisted magnetic recording head. FIG. 8A to FIG. 12A are plan views each showing part of the stack. FIG. 8B to FIG. 12B and FIG. 8C to FIG. 12C are cross-sectional views each showing part of the stack. FIG. 8D is a perspective view showing part of the stack. Note that portions located below the cladding layer 12 are omitted from FIG. 8B to FIG. 12B, FIG. 8C to FIG. 12C, and FIG. 8D. FIG. 8B to FIG. 12B each show a cross section that intersects the first end face 19a of the main pole 19 and that is perpendicular to the medium facing surface 60 and to the top surface 1a of the substrate 1. FIG. 8C to FIG. 12C each show a cross section of the stack taken in the position at which the medium facing surface 60 is to be formed. The symbol "ABS" in each of FIG. 8A to FIG. 12A and FIG. 8B to FIG. 12B indicates the position at which the medium facing surface 60 is to be formed.

FIG. 8A to FIG. 8D show a step that follows the formation of the cladding layer 12. In this step, first, the core 13 and the coupling layers 31 and 32 are formed on the cladding layer 12. Next, the cladding layer 14 is formed to cover the core 13 and the coupling layers 31 and 32. The cladding layer 14 is then polished by, for example, chemical mechanical polishing (hereinafter referred to as CMP), until the core 13 and the coupling layers 31 and 32 are exposed.

Figure 9A:
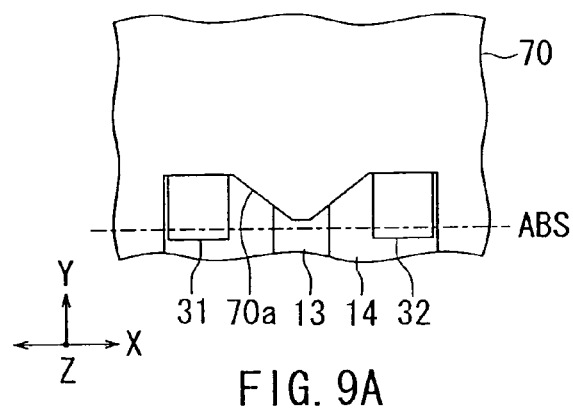
FIG. 9A to FIG. 9C are explanatory diagrams showing a step that follows the step shown in FIG. 8A to FIG. 8D.
Figure 9B:
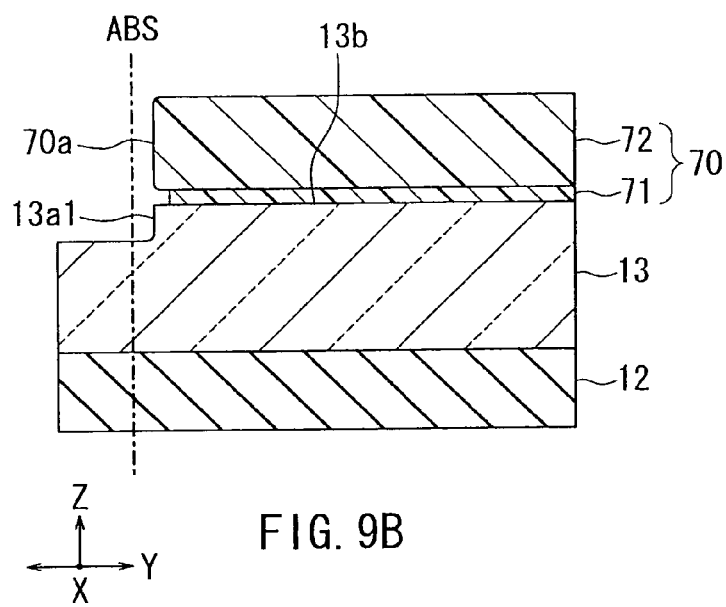
Figure 9C:
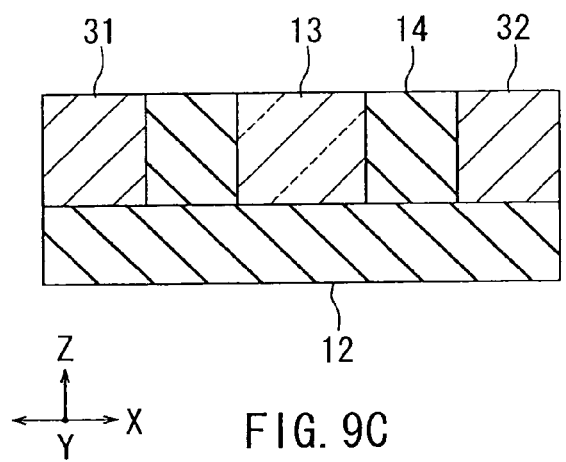

FIG. 9A to FIG. 9C show the next step. In this step, first, a mask 70 having an opening 70a in the shape corresponding to the planar shape of the shield 16 is formed on the top surface of the stack. The mask 70 is preferably shaped to have an undercut as shown in FIG. 9B for the sake of easy removal later. For example, the undercut mask 70 may consist of a lower layer 71 and an upper layer 72 as shown in FIG. 9B. The upper layer 72 is formed of a photoresist that is patterned by photolithography. The lower layer 71 is formed of, for example, a material that dissolves in a developing solution to be used when patterning the upper layer 72.

Using the mask 70 as an etching mask, portions of the core 13, the cladding layer 14 and the coupling layers 31 and 32 are then etched by ion beam etching, for example. This provides the stack with a groove for accommodating the shield 16 to be formed later, and provides the front end face 13a of the core 13 with the first portion 13a1.

Figure 10A:
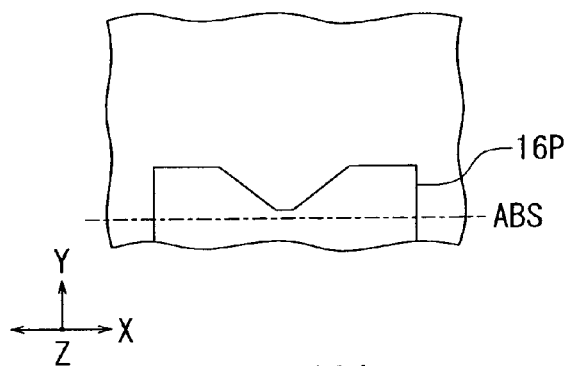
FIG. 10A to FIG. 10C are explanatory diagrams showing a step that follows the step shown in FIG. 9A to FIG. 9C.
Figure 10B:
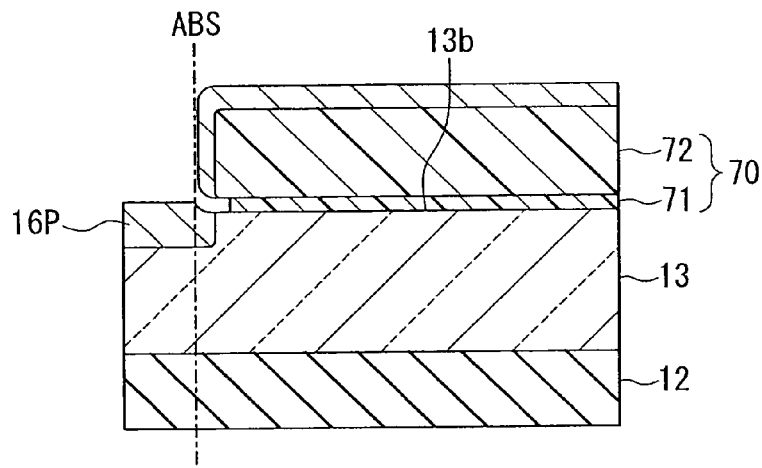
Figure 10C:
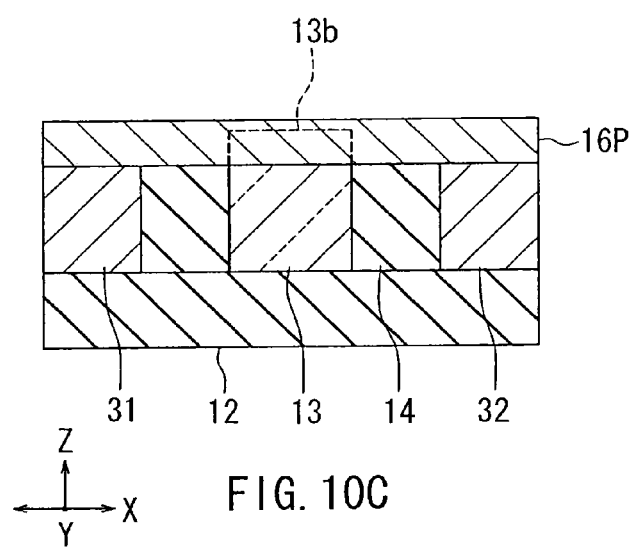

FIG. 10A to FIG. 10C show the next step. In this step, a magnetic layer 16P, which is to become the shield 16 later, is formed over the entire top surface of the stack by ion beam deposition, for example. The material for forming the magnetic layer 16P deposits on the aforementioned groove and on the surface of the upper layer 72 of the mask 70. The deposit on the groove makes the magnetic layer 16P. The magnetic layer 16P is formed such that its top surface is at a higher level than the evanescent light generating surface 13b of the core 13.

Figure 11A:
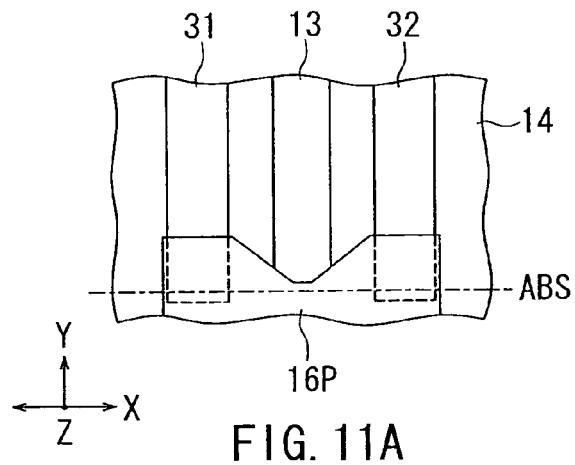
FIG. 11A to FIG. 11C are explanatory diagrams showing a step that follows the step shown in FIG. 10A to FIG. 10C.
Figure 11B:
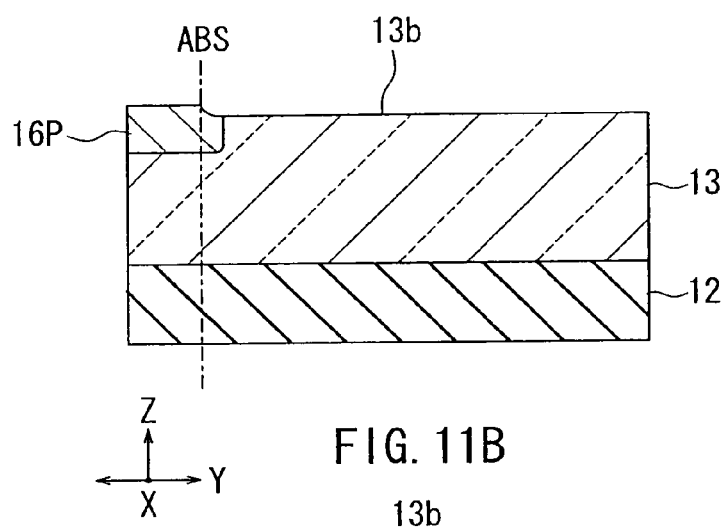
Figure 11C:
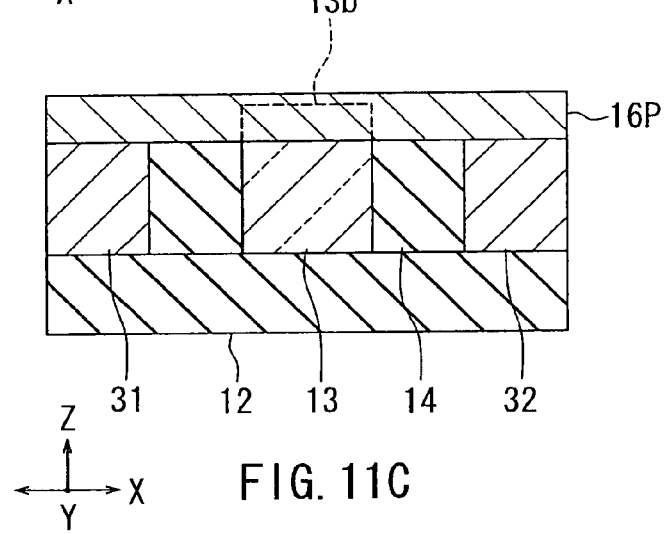
Figure 12A:
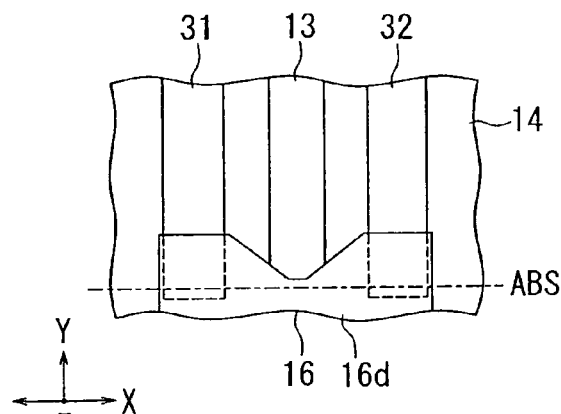
FIG. 12A to FIG. 12C are explanatory diagrams showing a step that follows the step shown in FIG. 11A to FIG. 11C.
Figure 12B:
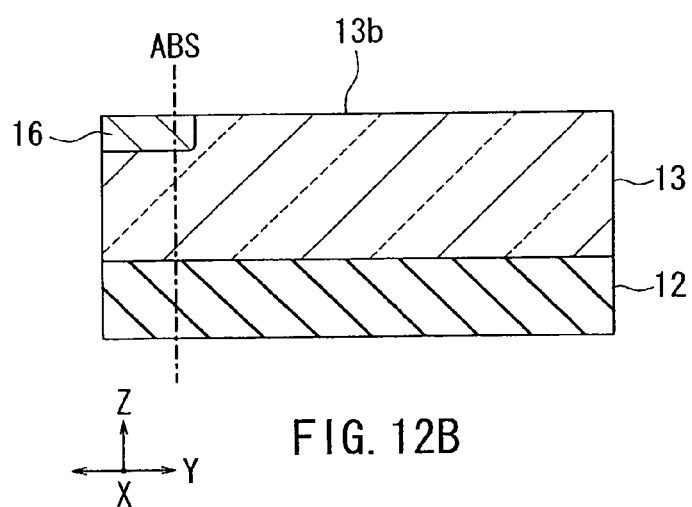
Figure 12C:
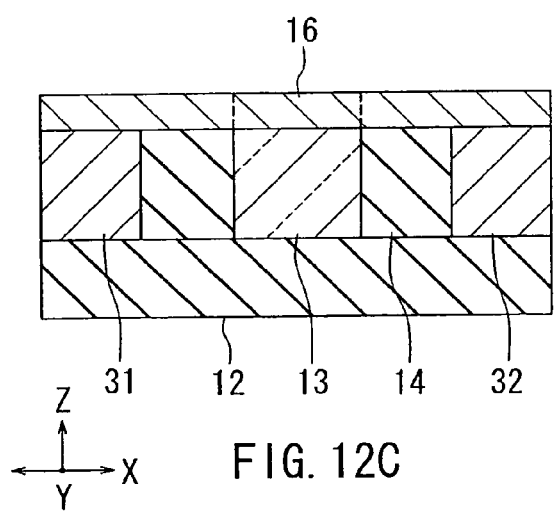

Next, as shown in FIG. 11A to FIG. 11C, the mask 70 is lifted off. The top surface of the magnetic layer 16P is then slightly polished until it reaches the level of the evanescent light generating surface 13b, as shown in FIG. 12A to FIG. 12C. This makes the magnetic layer 16P into the shield 16.

The steps to follow the formation of the shield 16 will now be described with reference to FIG. 3 and FIG. 4. First, the cladding layer 15 is formed over the entire top surface of the stack. Next, the plasmon generator 40, the dielectric layer 17, and the dielectric layer 18 are formed in this order on the cladding layer 15. The cladding layer 15 and the dielectric layers 17 and 18 are then selectively etched to form therein two openings for exposing the top surfaces of the coupling layers 31 and 32. Next, the coupling layers 36 and 37 are formed on the coupling layers 31 and 32 at the positions of the two openings. Then, the main pole 19 is formed on the dielectric layer 18, and the coupling layer 38 is formed on the dielectric layer 18 and the coupling layers 36 and 37. Next, the dielectric layer 24 is formed to cover the main pole 19 and the coupling layer 38. The dielectric layer 24 is then polished by, for example, CMP, until the main pole 19 and the coupling layer 38 are exposed.

Next, the coil 25 is formed on the dielectric layer 24. The insulating layer 26 is then formed to cover the coil 25. Next, the coupling layer 39 is formed over the main pole 19, the insulating layer 26 and the coupling layer 38. Then, the protective layer 27 is formed to cover the coupling layer 39. Wiring, terminals, and other components are then formed on the top surface of the protective layer 27. When the substructure is completed thus, the substructure is cut to separate the plurality of pre-head portions from each other, followed by the polishing of the medium facing surface 60 and the fabrication of flying rails, etc. This completes the thermally-assisted magnetic recording head. The formation of the medium facing surface 60 provides the second portion 13a2 of the front end face 13a of the core 13.

Modification Example

Figure 13:
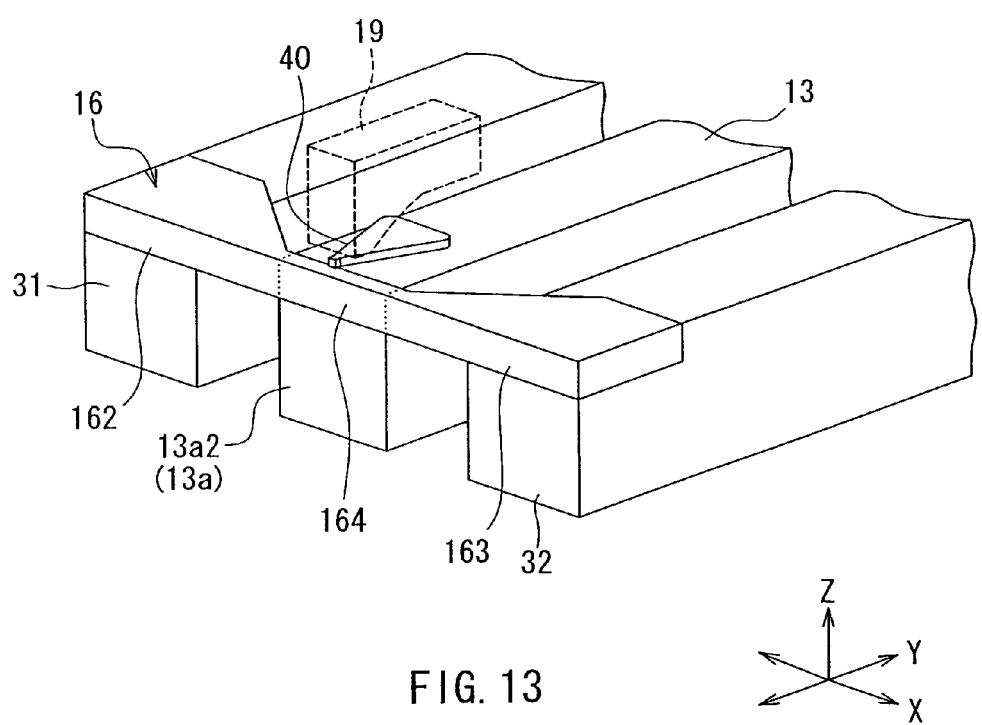
FIG. 13 is a perspective view showing the main part of a modification example of the thermally-assisted magnetic recording head according to the first embodiment of the invention.
Figure 14:
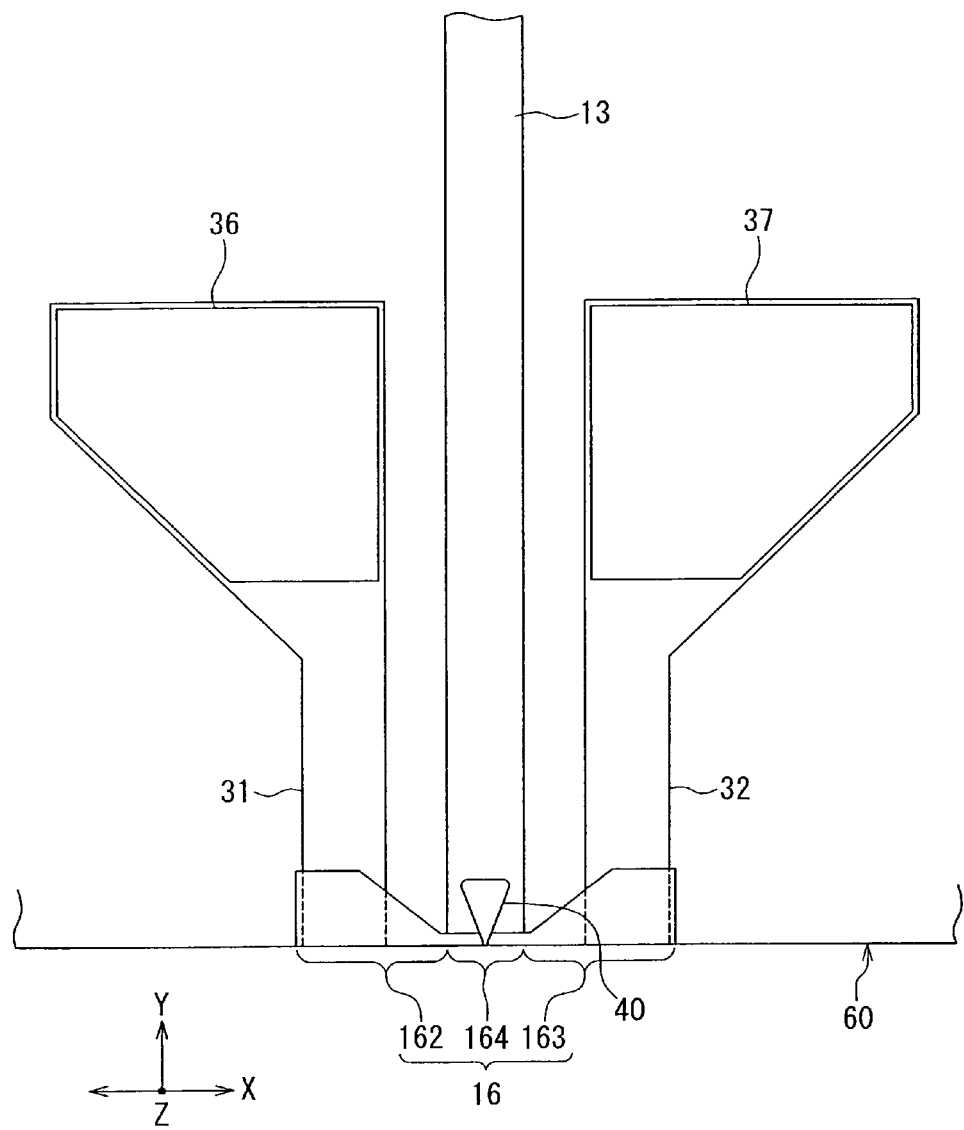
FIG. 14 is a plan view showing a part of the modification example of the thermally-assisted magnetic recording head according to the first embodiment of the invention.

A modification example of the thermally-assisted magnetic recording head according to the present embodiment will now be described with reference to FIG. 13 and FIG. 14. FIG. 13 is a perspective view showing the main part of the modification example of the thermally-assisted magnetic recording head. FIG. 14 is a plan view showing a part of the modification example of the thermally-assisted magnetic recording head. In the modification example, the shield 16 has an overlapping portion 164 in place of the overlapping portion 161 shown in FIG. 2 and FIG. 5. In FIG. 13, the boundaries between the overlapping portion 164 and the non-overlapping portions 162 and 163 are shown by dotted lines. The overlapping portion 164 overlaps the first region R1 (see FIG. 2) when viewed in the direction perpendicular to the medium facing surface 60. As shown in FIG. 14, the length of the overlapping portion 164 in the direction perpendicular to the medium facing surface 60 (the Y direction) is constant regardless of position in the track width direction (the X direction). The maximum length of each of the non-overlapping portions 162 and 163 in the direction perpendicular to the medium facing surface 60 is greater than the length of the overlapping portion 164 in the same direction.

Second Embodiment

Figure 15:
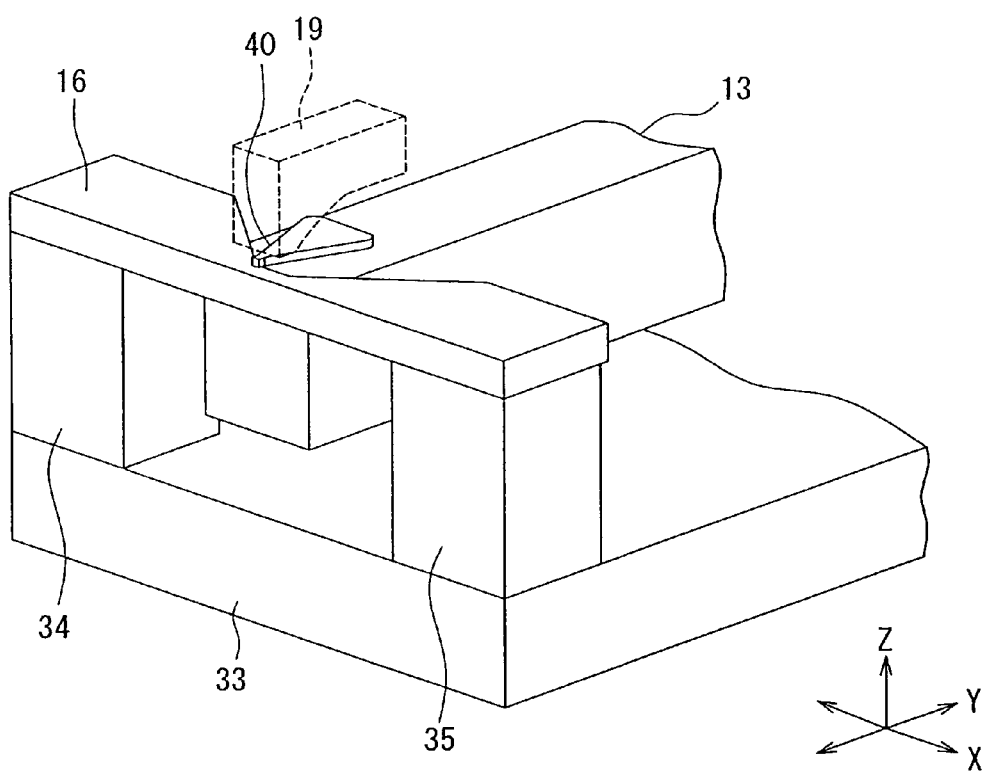
FIG. 15 is a perspective view showing the main part of a thermally-assisted magnetic recording head according to a second embodiment of the invention.
Figure 16:
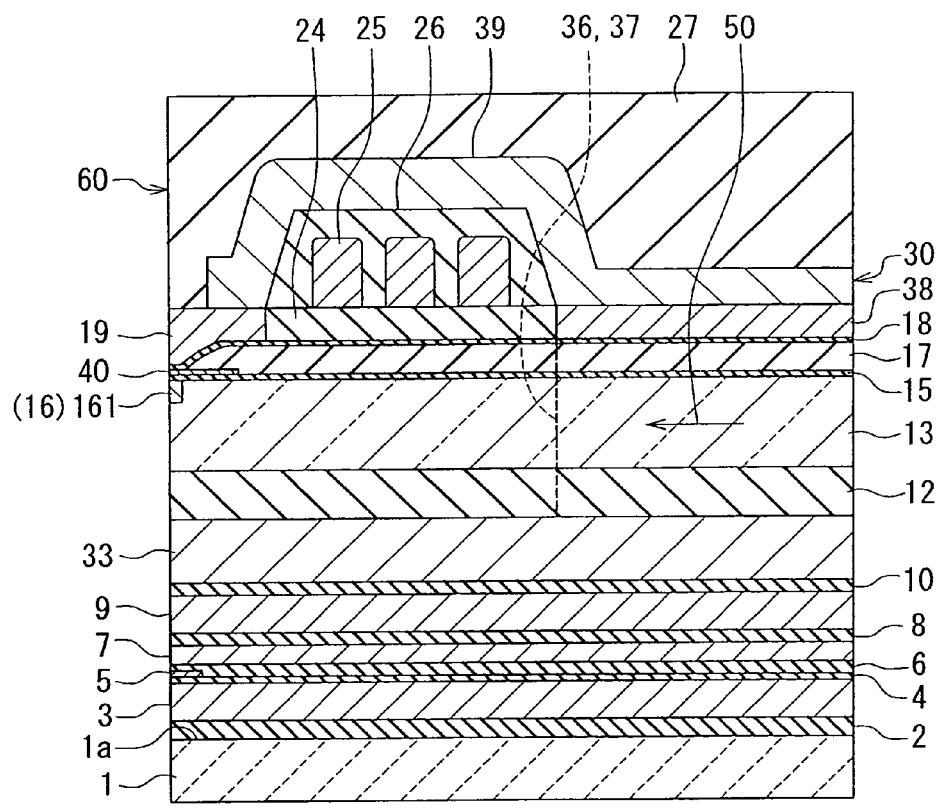
FIG. 16 is a cross-sectional view showing the configuration of the thermally-assisted magnetic recording head according to the second embodiment of the invention.
Figure 17:
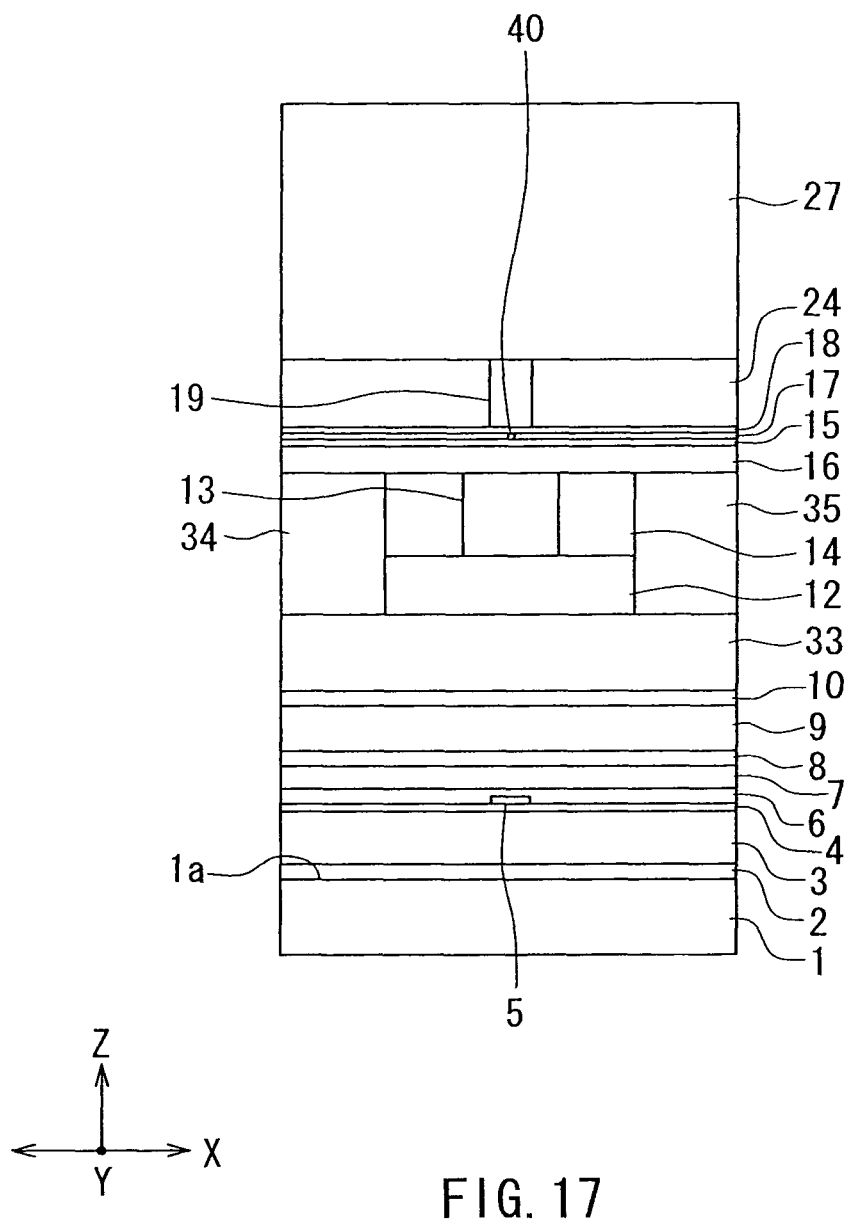
FIG. 17 is a front view showing the medium facing surface of the thermally-assisted magnetic recording head according to the second embodiment of the invention.
Figure 18:
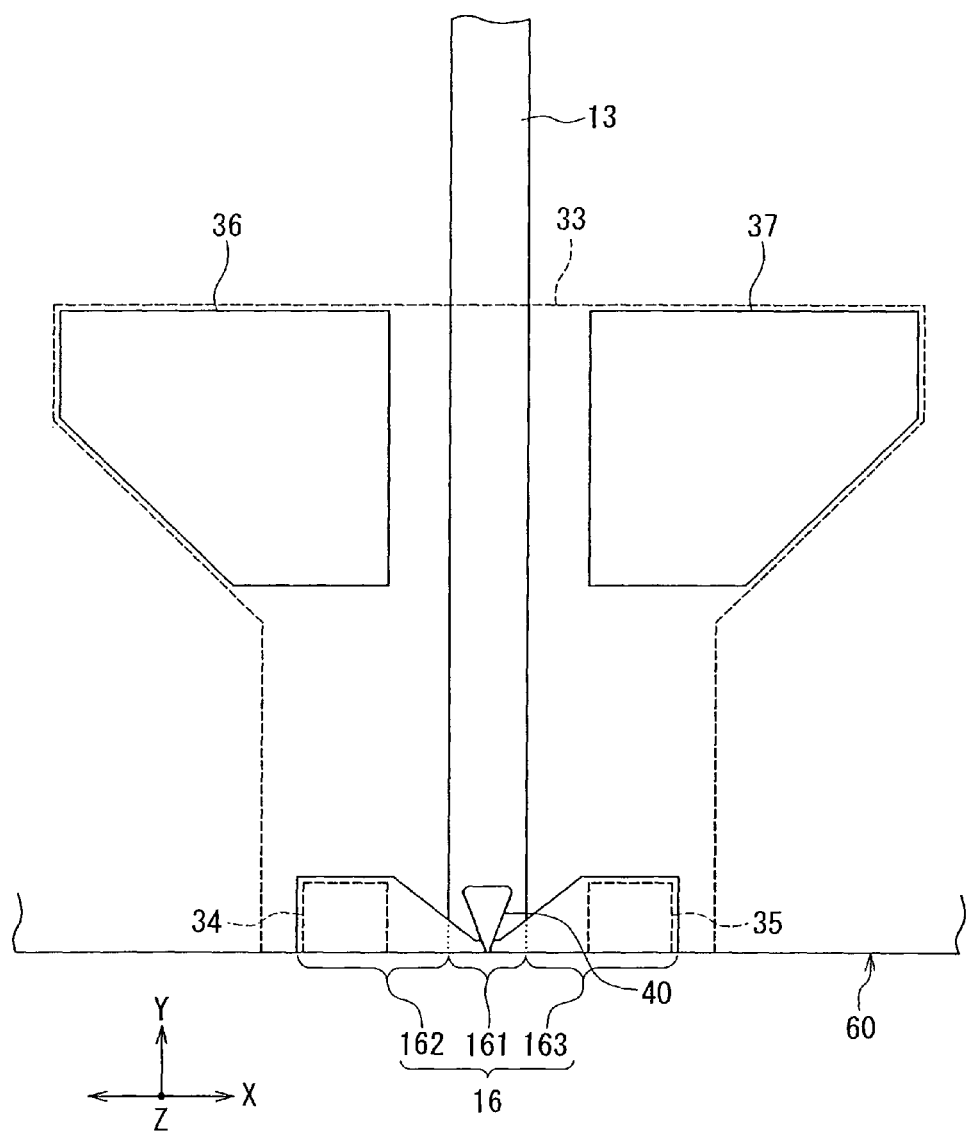
FIG. 18 is a plan view showing a part of the thermally-assisted magnetic recording head according to the second embodiment of the invention.

A thermally-assisted magnetic recording head according to a second embodiment of the invention will now be described. First, reference is made to FIG. 15 to FIG. 18 to describe the configuration of the thermally-assisted magnetic recording head according to the present embodiment. FIG. 15 is a perspective view showing the main part of the thermally-assisted magnetic recording head. FIG. 16 is a cross-sectional view showing the configuration of the thermally-assisted magnetic recording head. FIG. 17 is a front view showing the medium facing surface of the thermally-assisted magnetic recording head. FIG. 18 is a plan view showing a part of the thermally-assisted magnetic recording head.

The configuration of the thermally-assisted magnetic recording head according to the present embodiment is different from that of the first embodiment in the following respects. In the thermally-assisted magnetic recording head according to the present embodiment, the return path section 30 has coupling layers 33, 34, and 35 in place of the coupling layers 31 and 32. Further, the thermally-assisted magnetic recording head has a nonmagnetic layer 10 made of a nonmagnetic material and interposed between the middle shield layer 9 and the cladding layer 12, and an insulating layer (not shown). The coupling layer 33 has an end face located in the medium facing surface 60, and lies between the nonmagnetic layer 10 and the cladding layer 12. The width of the coupling layer 33 in the track width direction (the X direction) is greater in the area away from the medium facing surface 60 than in the medium facing surface 60. The insulating layer (not shown) is interposed between the nonmagnetic layer 10 and the cladding layer 12 and surrounds the coupling layer 33. The nonmagnetic layer 10 and the insulating layer (not shown) are made of alumina, for example.

The coupling layers 34 and 35 are located in the vicinity of the medium facing surface 60, and lies on the coupling layer 33 at positions on opposite sides of the core 13 in the track width direction (the X direction), being spaced from the core 13. The coupling layer 34 is connected to the non-overlapping portion 162 of the shield 16. More specifically, the coupling layer 34 is in contact with a part of at least the bottom surface 16c of the outer surface of the shield 16, the part being included in the non-overlapping portion 162. The coupling layer 35 is connected to the non-overlapping portion 163 of the shield 16. More specifically, the coupling layer 35 is in contact with a part of at least the bottom surface 16c of the outer surface of the shield 16, the part being included in the non-overlapping portion 163.

In the present embodiment, each of the coupling layers 36 and 37 has a first layer, and a second layer located on the first layer. The first layer of the coupling layer 36 and the first layer of the coupling layer 37 are located farther from the medium facing surface 60 than are the coupling layers 34 and 35, and lie on the coupling layer 33 at positions on opposite sides of the core 13 in the track width direction (the X direction), being spaced from the core 13. The cladding layers 12 and 14 are disposed around the coupling layers 34 and 35 and the first layers of the coupling layers 36 and 37. The cladding layer 15 and the dielectric layers 17 and 18 are disposed around the second layers of the coupling layers 36 and 37. The bottom surface of the coupling layer 38 is in contact with the top surfaces of the second layers of the coupling layers 36 and 37.

Figure 19A:
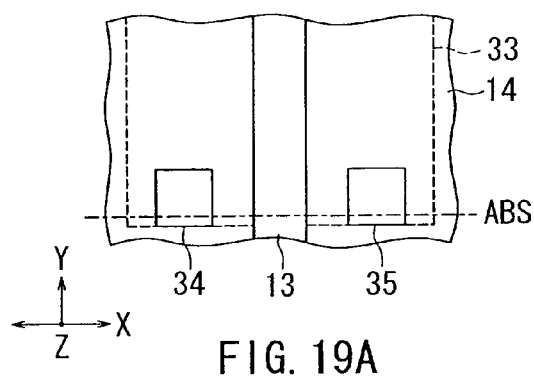
FIG. 19A to FIG. 19D are explanatory diagrams showing a step of a method of manufacturing the thermally-assisted magnetic recording head according to the second embodiment of the invention.
Figure 19B:
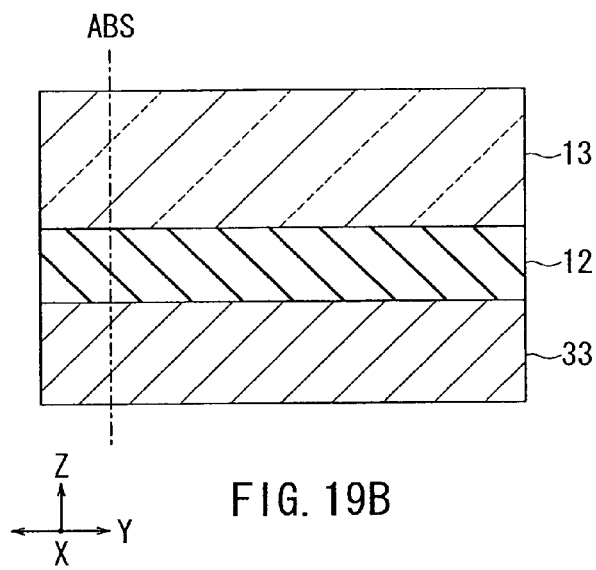
Figure 19C:
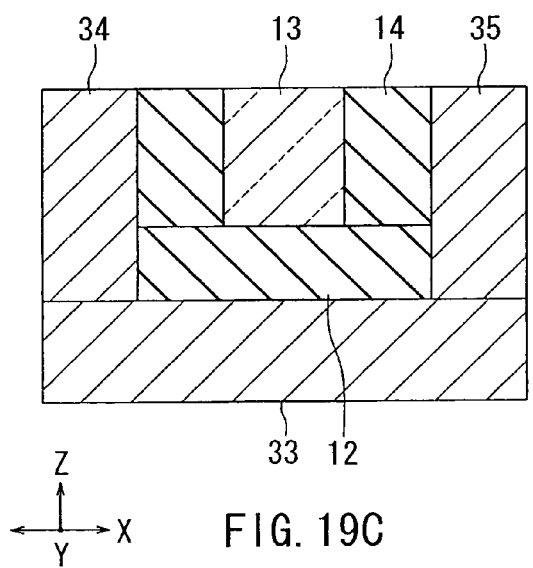
Figure 19D:
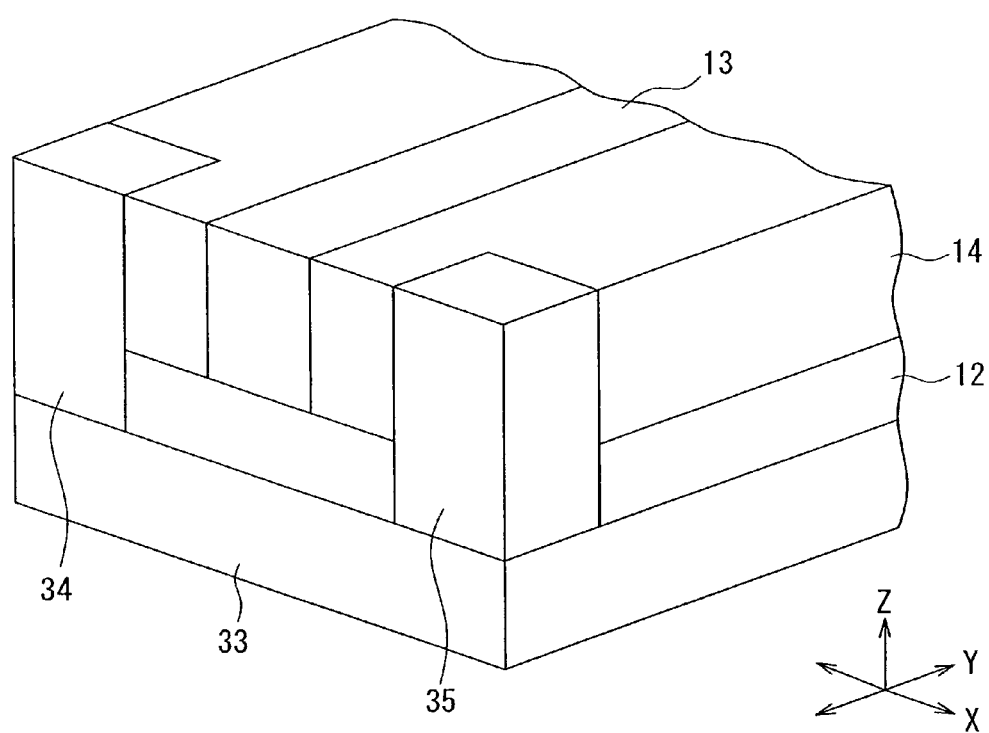
Figure 20A:
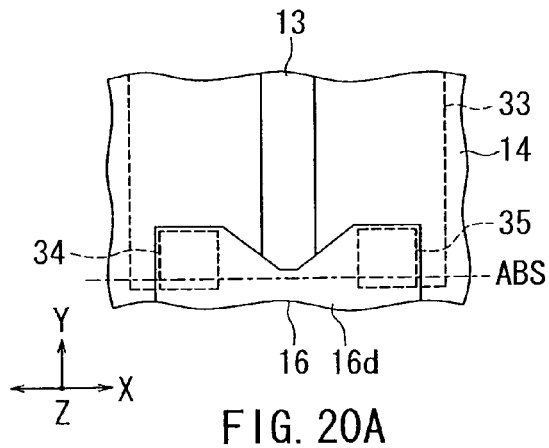
FIG. 20A to FIG. 20C are explanatory diagrams showing another step of the method of manufacturing the thermally-assisted magnetic recording head according to the second embodiment of the invention.
Figure 20B:
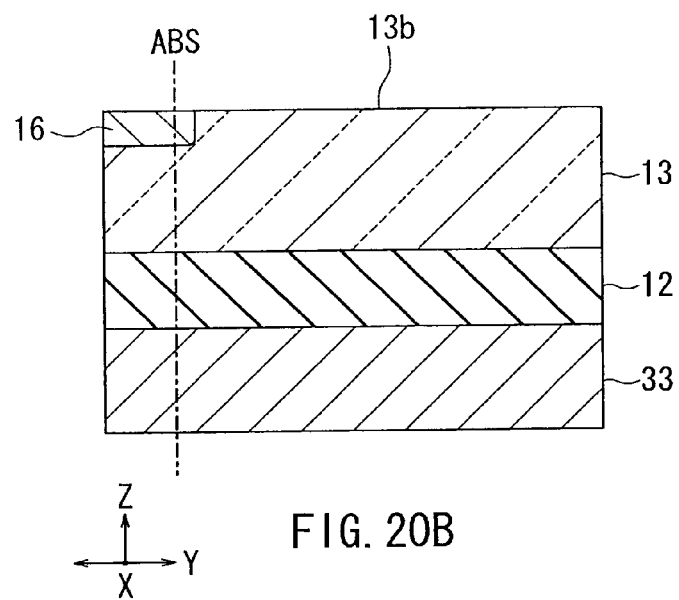
Figure 20C:
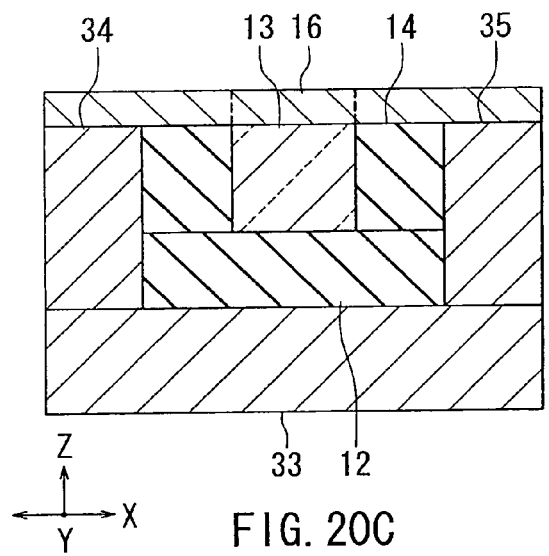

A method of manufacturing the thermally-assisted magnetic recording head according to the present embodiment will now be described with reference to FIG. 19A through FIG. 20C. FIG. 19A through FIG. 20C each show a stack of layers formed in the process of manufacturing the thermally-assisted magnetic recording head. FIG. 19A and FIG. 20A are plan views each showing part of the stack. FIG. 19B and FIG. 20B, and FIG. 19C and FIG. 20C are cross-sectional views each showing part of the stack. FIG. 19D is a perspective view showing part of the stack. Note that portions located below the coupling layer 33 are omitted from FIG. 19B to FIG. 19D, FIG. 20B, and FIG. 20C. FIG. 19B and FIG. 20B each show a cross section that intersects the first end face 19a of the main pole 19 and that is perpendicular to the medium facing surface 60 and to the top surface 1a of the substrate 1. FIG. 19C and FIG. 20C each show a cross section of the stack taken in the position at which the medium facing surface 60 is to be formed. The symbol "ABS" in each of FIG. 19A, FIG. 19B, FIG. 20A and FIG. 20B indicates the position at which the medium facing surface 60 is to be formed.

The method of manufacturing the thermally-assisted magnetic recording head according to the present embodiment is the same as the method according to the first embodiment up to the step of forming the middle shield layer 9. In the next step of the present embodiment, the nonmagnetic layer 10 and the coupling layer 33 are formed in this order. Next, an insulating layer (not shown) is formed to cover the coupling layer 33. The insulating layer (not shown) is then polished by, for example, CMP, until the coupling layer 33 is exposed. Next, the cladding layer 12 is formed over the entire top surface of the stack. The cladding layer 12 is then selectively etched to form therein four openings for exposing the top surface of the coupling layer 33. Then, the coupling layers 34 and 35 and the first layers of the coupling layers 36 and 37 are formed on the coupling layer 33 at the positions of the four openings. Next, the core 13 is formed on the cladding layer 12. Note that the coupling layers 34 and 35 and the first layers of the coupling layers 36 and 37 may be formed after the formation of the core 13. Next, the cladding layer 14 is formed to cover the core 13, the coupling layers 34 and 35, and the first layers of the coupling layers 36 and 37. The cladding layer 14 is then polished by, for example, CMP, until the core 13, the coupling layers 34 and 35 and the first layers of the coupling layers 36 and 37 are exposed. FIG. 19A to FIG. 19D show the stack having undergone the polishing of the cladding layer 14.

Next, the shield 16 is formed in the same manner as in the first embodiment. FIG. 20A to FIG. 20C show the stack having undergone the formation of the shield 16. Next, the cladding layer 15, the plasmon generator 40, the dielectric layer 17, and the dielectric layer 18 are formed in this order. The cladding layer 15 and the dielectric layers 17 and 18 are then selectively etched to form therein two openings for exposing the top surfaces of the first layers of the coupling layers 36 and 37. Next, the second layers of the coupling layers 36 and 37 are formed on the first layers of the coupling layers 36 and 37. The subsequent steps are the same as those in the first embodiment.

Modification Example

Figure 21:
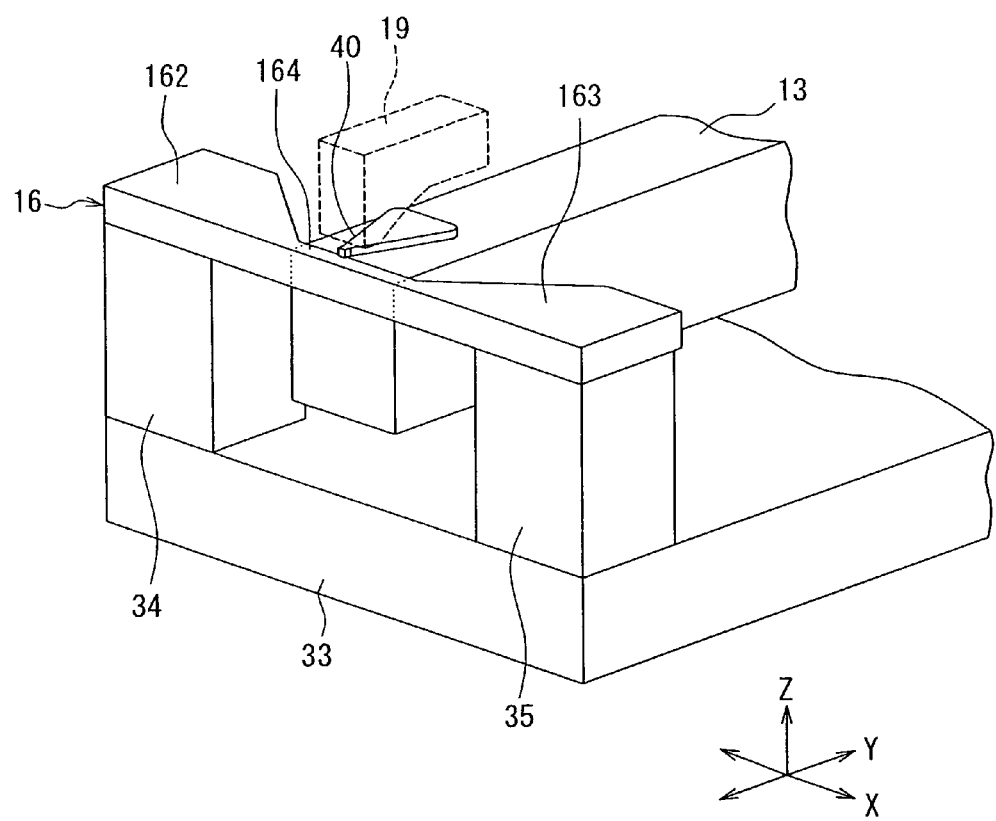
FIG. 21 is a perspective view showing the main part of a modification example of the thermally-assisted magnetic recording head according to the second embodiment of the invention.

A modification example of the thermally-assisted magnetic recording head according to the present embodiment will now be described with reference to FIG. 21. FIG. 21 is a perspective view showing the main part of the modification example of the thermally-assisted magnetic recording head.

In the modification example, the shield 16 has the overlapping portion 164 which has been described in relation to the first embodiment, in place of the overlapping portion 161 shown in FIG. 16 and FIG. 18. In FIG. 21, the boundaries between the overlapping portion 164 and the non-overlapping portions 162 and 163 are shown by dotted lines.

The remainder of configuration, function and effects of the present embodiment are similar to those of the first embodiment.

Third Embodiment

Figure 22:
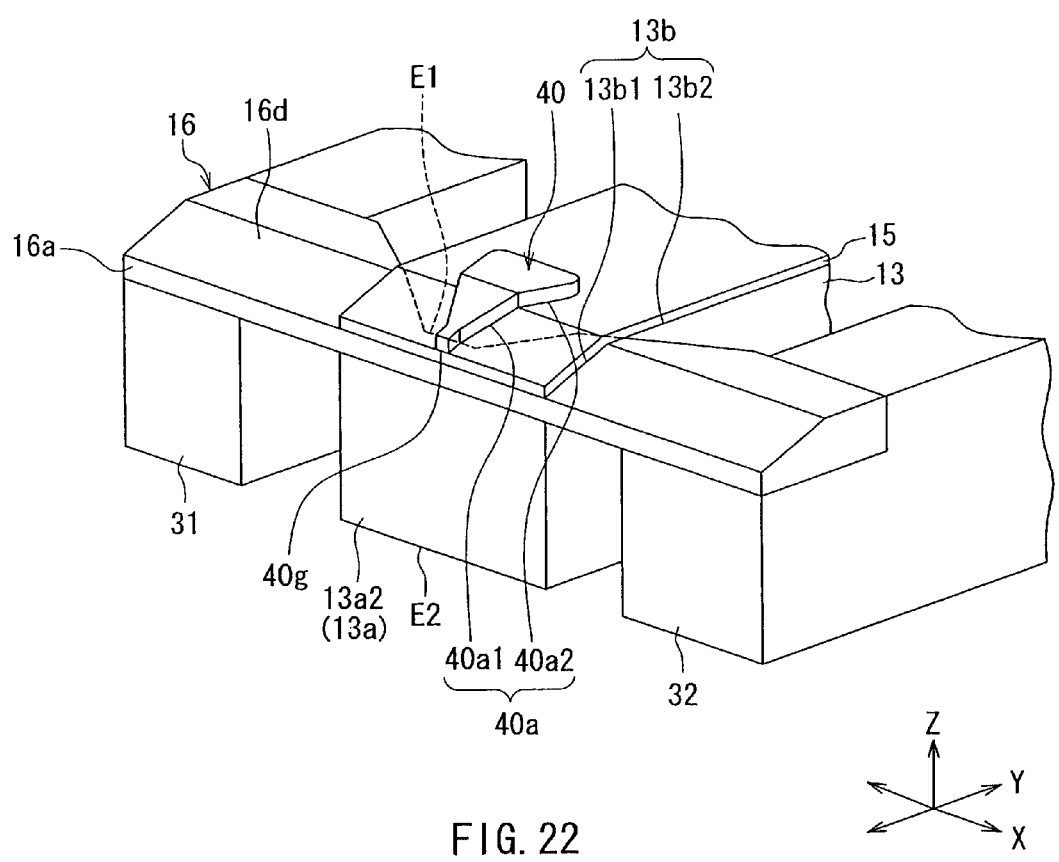
FIG. 22 is a perspective view showing the main part of a thermally-assisted magnetic recording head according to a third embodiment of the invention.
Figure 23:
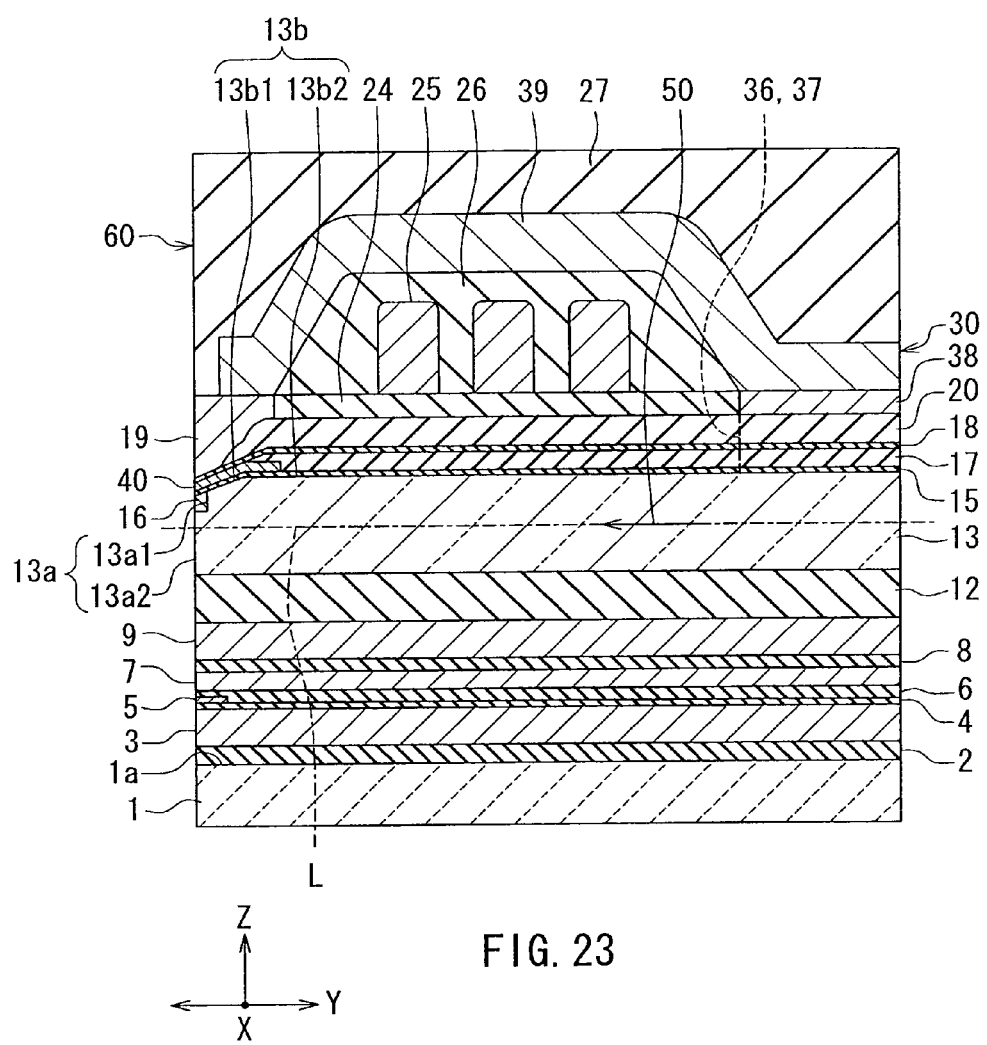
FIG. 23 is a cross-sectional view showing the configuration of the thermally-assisted magnetic recording head according to the third embodiment of the invention.

A thermally-assisted magnetic recording head according to a third embodiment of the invention will now be described with reference to FIG. 22 and FIG. 23. FIG. 22 is a perspective view showing the main part of the thermally-assisted magnetic recording head. FIG. 23 is a cross-sectional view showing the configuration of the thermally-assisted magnetic recording head.

The configuration of the thermally-assisted magnetic recording head according to the present embodiment is different from that of the first embodiment in the following respects. The thermally-assisted magnetic recording head according to the present embodiment has a dielectric layer 20 located away from the medium facing surface 60 and lying on the dielectric layer 18. The thickness (the dimension in the Z direction) of the dielectric layer 20 gradually increases with increasing distance from the medium facing surface 60, and then becomes constant. In the present embodiment, the main pole 19 is disposed over the dielectric layers 18 and 20. Portions of the coupling layers 36 and 37 are embedded in the dielectric layer 20. The coupling layer 38 is disposed over the coupling layers 36 and 37 and the dielectric layer 20. The dielectric layer 24 is disposed on the dielectric layer 20 and surrounds the main pole 19 and the coupling layer 38. The dielectric layer 20 is made of alumina, for example.

In the present embodiment, the evanescent light generating surface 13b of the core 13 includes an inclined portion 13b1 and a horizontal portion 13b2, the inclined portion 13b1 being located closer to the medium facing surface 60. The inclined portion 13b1 has a front end portion closer to the medium facing surface 60 and a rear end portion opposite to the front end portion. The front end portion of the inclined portion 13b1 also serves as the forward end of the first portion 13a1 of the front end face 13a of the core 13 in the direction of travel of the recording medium (the Z direction), and as the first end portion E1 of the front end face 13a. The horizontal portion 13b2 is connected to the rear end portion of the inclined portion 13b1.

Further, in the present embodiment, the plasmon exciting part 40a of the plasmon generator 40 includes an inclined portion 40a1 and a horizontal portion 40a2, the inclined portion 40a1 being located closer to the medium facing surface 60. The inclined portion 40a1 is opposed to part of the top surface 16d of the shield 16 and the inclined portion 13b1 of the evanescent light generating surface 13b, and has a front end portion located in the medium facing surface 60 and a rear end portion opposite to the front end portion. The horizontal portion 40a2 is opposed to the horizontal portion 13b2 of the evanescent light generating surface 13b, and is connected to the rear end portion of the inclined portion 40a1. The near-field light generating part 40g is located at the front extremity of the inclined portion 40a1.

Here, assume a virtual straight line that passes internally through the core 13 and is parallel to the direction of travel of laser light 50 propagating through the core 13. In FIG. 23, the dot-and-dash line with the reference letter L represents the aforementioned virtual straight line. The virtual straight line L intersects the front end face 13a of the core 13. The inclined portion 13b1 of the evanescent light generating surface 13b and the inclined portion 40a1 of the plasmon exciting part 40a are both inclined relative to the virtual straight line L such that the distance from the virtual straight line L decreases with increasing proximity to the medium facing surface 60. In other words, the inclined portions 13b1 and 40a1 are inclined such that their respective front end portions are located on the rear side in the direction of travel of the recording medium (the Z direction) relative to their respective rear end portions. Part of the top surface 16d of the shield 16 is contiguous with the inclined portion 13b1 and is inclined similarly to the inclined portion 13b1.

The horizontal portion 13b2 of the evanescent light generating surface 13b and the horizontal portion 40a2 of the plasmon exciting part 40a both extend substantially in the direction perpendicular to the medium facing surface 60 (the Y direction).

In the present embodiment, as mentioned above, the inclined portion 13b1, which is part of the evanescent light generating surface 13b, and the inclined portion 40a1, which is part of the plasmon exciting part 40a of the plasmon generator 40, are both inclined relative to the virtual straight line L such that the distance from the virtual straight line L decreases with increasing proximity to the medium facing surface 60. This allows a larger amount of the laser light 50 propagating through the core 13 to reach the evanescent light generating surface 13b than in the case where the evanescent light generating surface 13b includes only the horizontal portion 13b2 and the plasmon exciting part 40a includes only the horizontal portion 40a2, that is, the case where the entire evanescent light generating surface 13b and the entire plasmon exciting part 40a are arranged parallel to the direction of travel of the laser light 50 propagating through the core 13. Consequently, according to the present embodiment, it is possible to produce much evanescent light from the evanescent light generating surface 13b and to thereby excite a lot of surface plasmons on the plasmon generator 40.

The return path section 30 of the present embodiment may have the same configuration as that in the second embodiment. The remainder of configuration, function and effects of the present embodiment are similar to those of the first or second embodiment.

Fourth Embodiment

Figure 24:
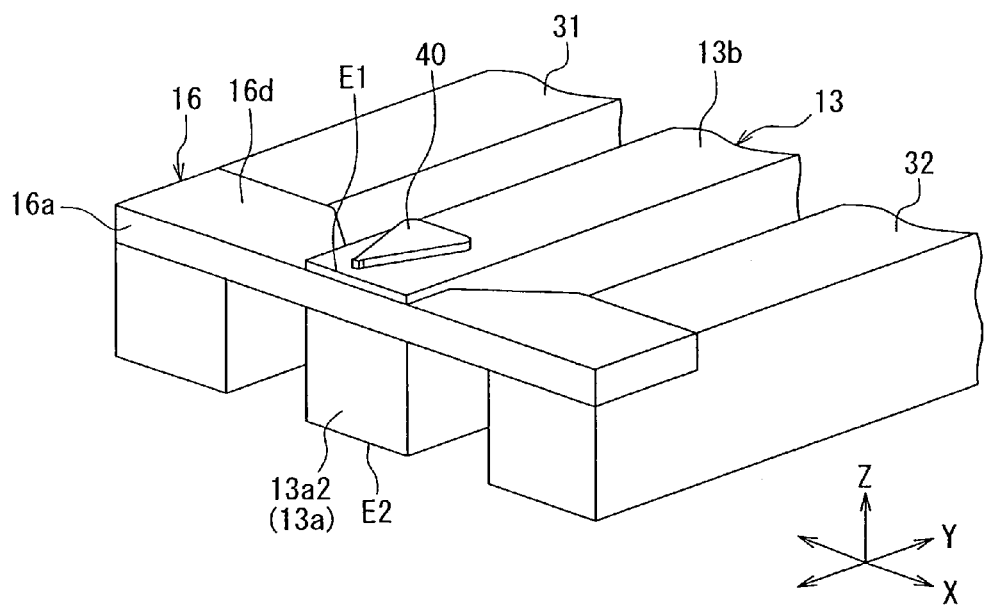
FIG. 24 is a perspective view showing the main part of a thermally-assisted magnetic recording head according to a fourth embodiment of the invention.

A thermally-assisted magnetic recording head according to a fourth embodiment of the invention will now be described with reference to FIG. 24. FIG. 24 is a perspective view showing the main part of the thermally-assisted magnetic recording head. The configuration of the thermally-assisted magnetic recording head according to the present embodiment is different from that of the first embodiment in the following respects. In the thermally-assisted magnetic recording head according to the present embodiment, part of the shield 16 is embedded in the core 13 so that the top surface 16d of the shield 16 is located on the rear side in the direction of travel of the recording medium (the Z direction) relative to the evanescent light generating surface 13b of the core 13. In the front end face 13a of the core 13, part of the second portion 13a2 is located on the front side in the direction of travel of the recording medium relative to the second end face 16a of the shield 16. The first end portion E1 of the front end face 13a is composed of the forward end of the second portion 13a2 in the direction of travel of the recording medium.

The return path section 30 of the present embodiment may have the same configuration as that in the second embodiment. The remainder of configuration, function and effects of the present embodiment are similar to those of the first or second embodiment.

Fifth Embodiment

Figure 25:
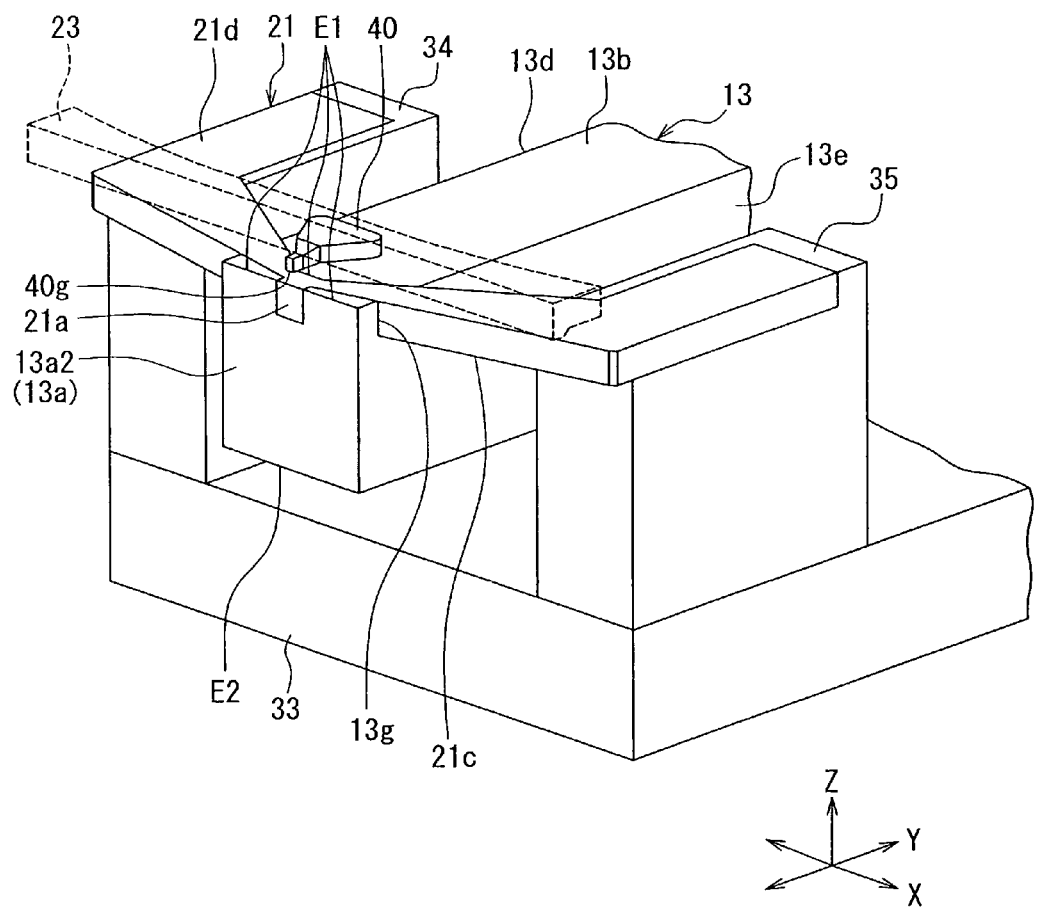
FIG. 25 is a perspective view showing the main part of a thermally-assisted magnetic recording head according to a fifth embodiment of the invention.
Figure 26:
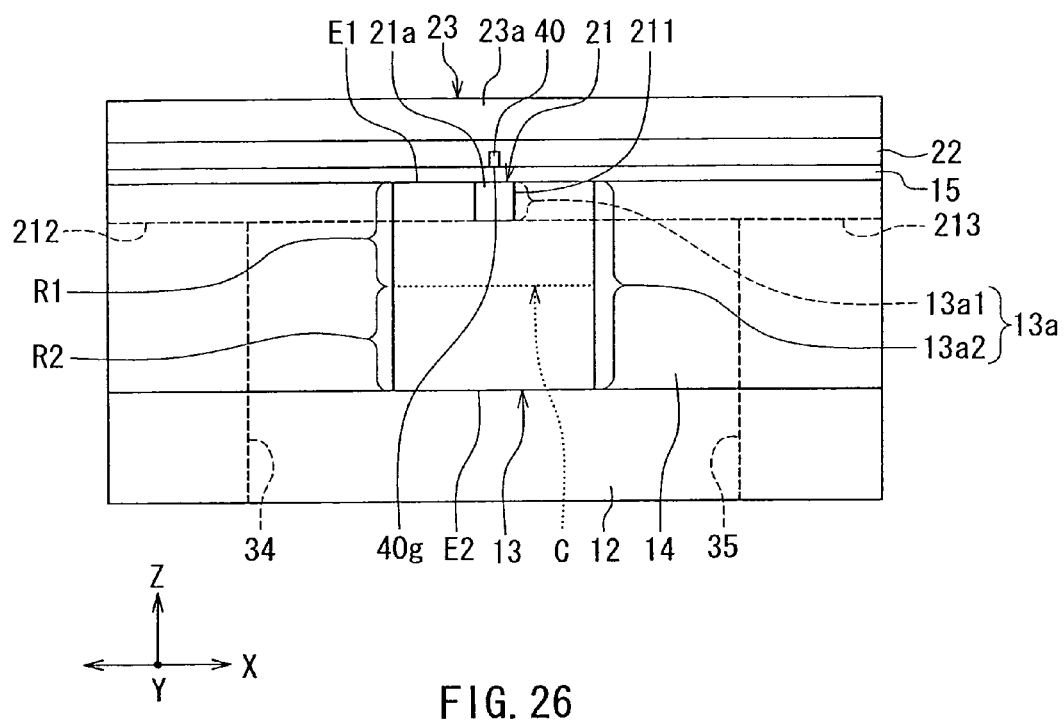
FIG. 26 is a front view showing the main part of the thermally-assisted magnetic recording head according to the fifth embodiment of the invention.
Figure 27:
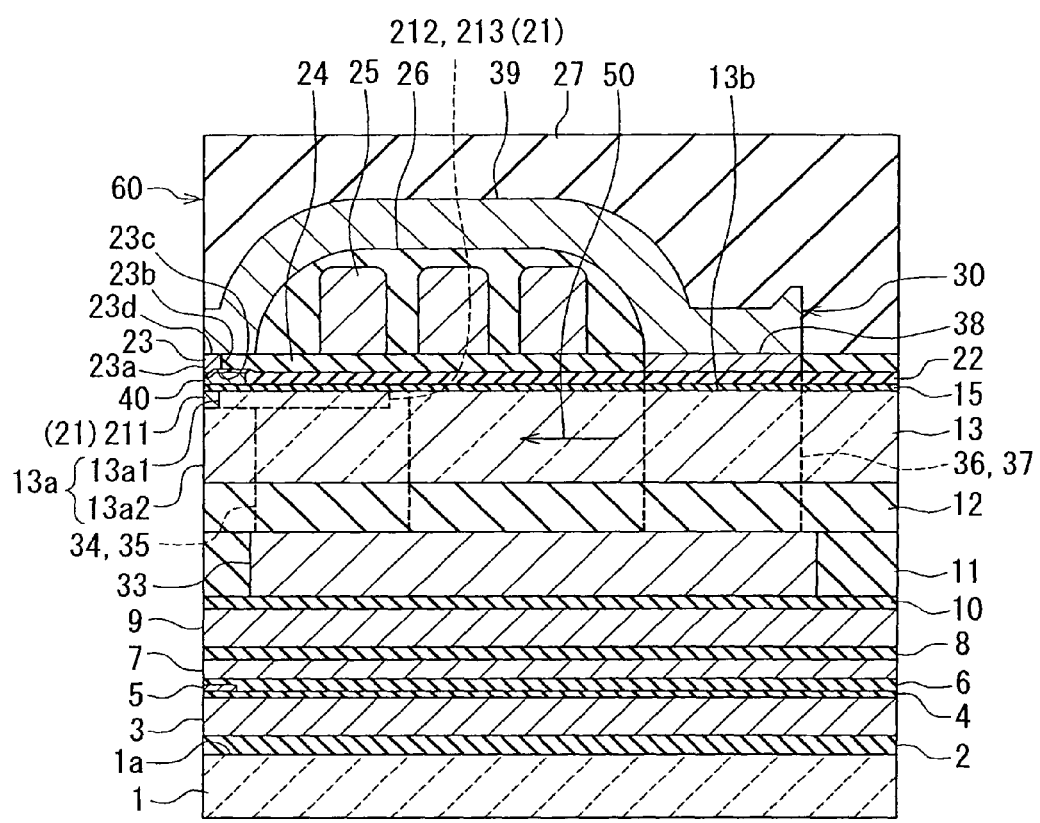
FIG. 27 is a cross-sectional view showing the configuration of the thermally-assisted magnetic recording head according to the fifth embodiment of the invention.
Figure 28:
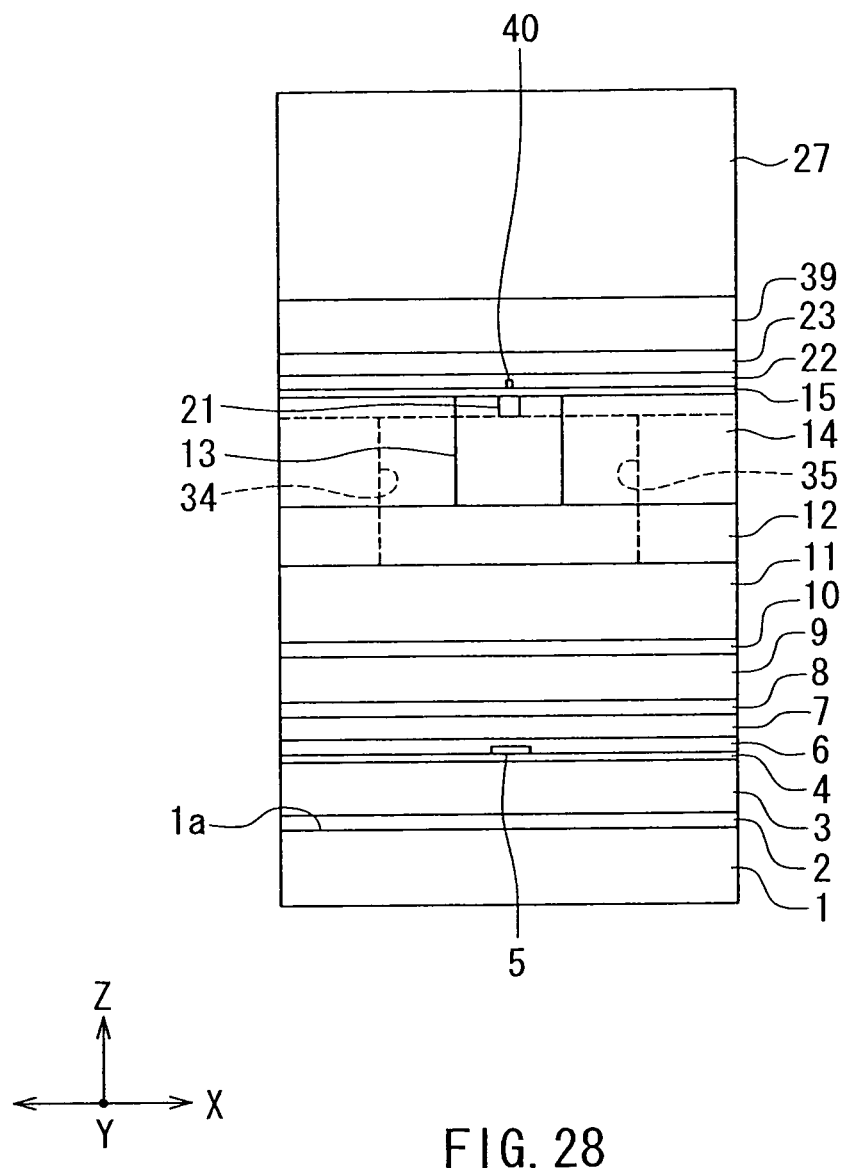
FIG. 28 is a front view showing the medium facing surface of the thermally-assisted magnetic recording head according to the fifth embodiment of the invention.
Figure 29:
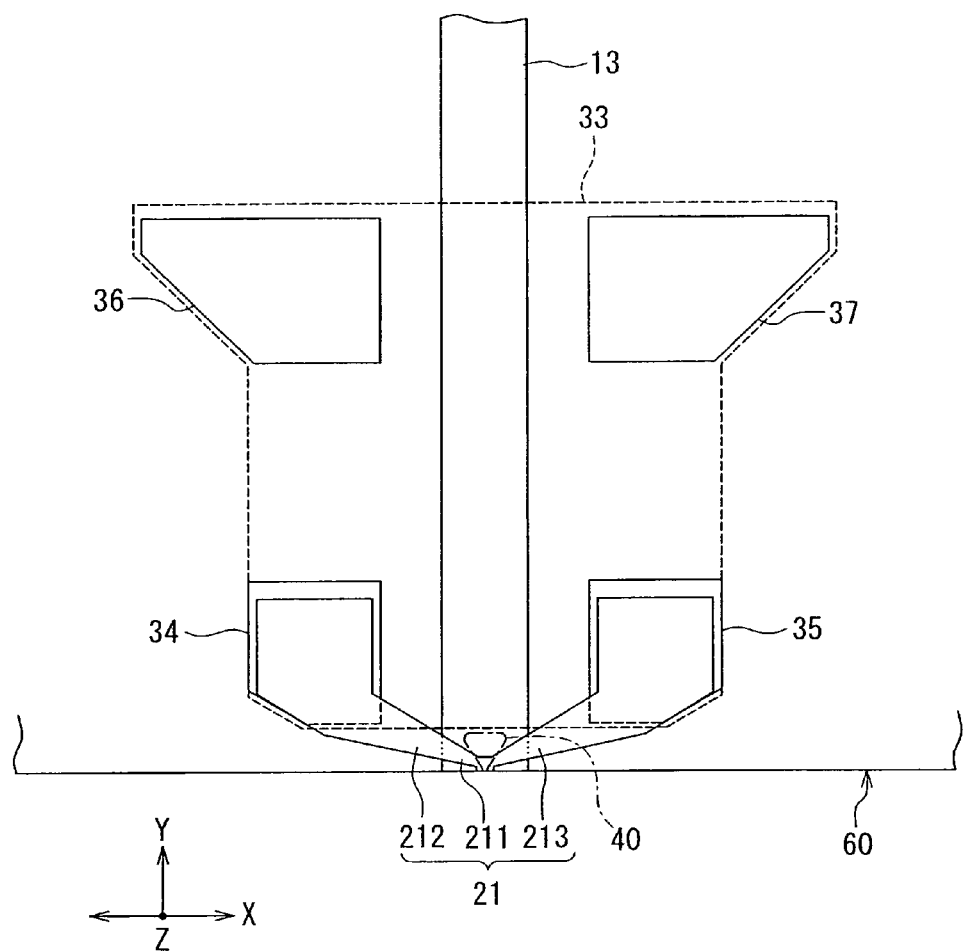
FIG. 29 is a plan view showing a part of the thermally-assisted magnetic recording head according to the fifth embodiment of the invention.
Figure 30:
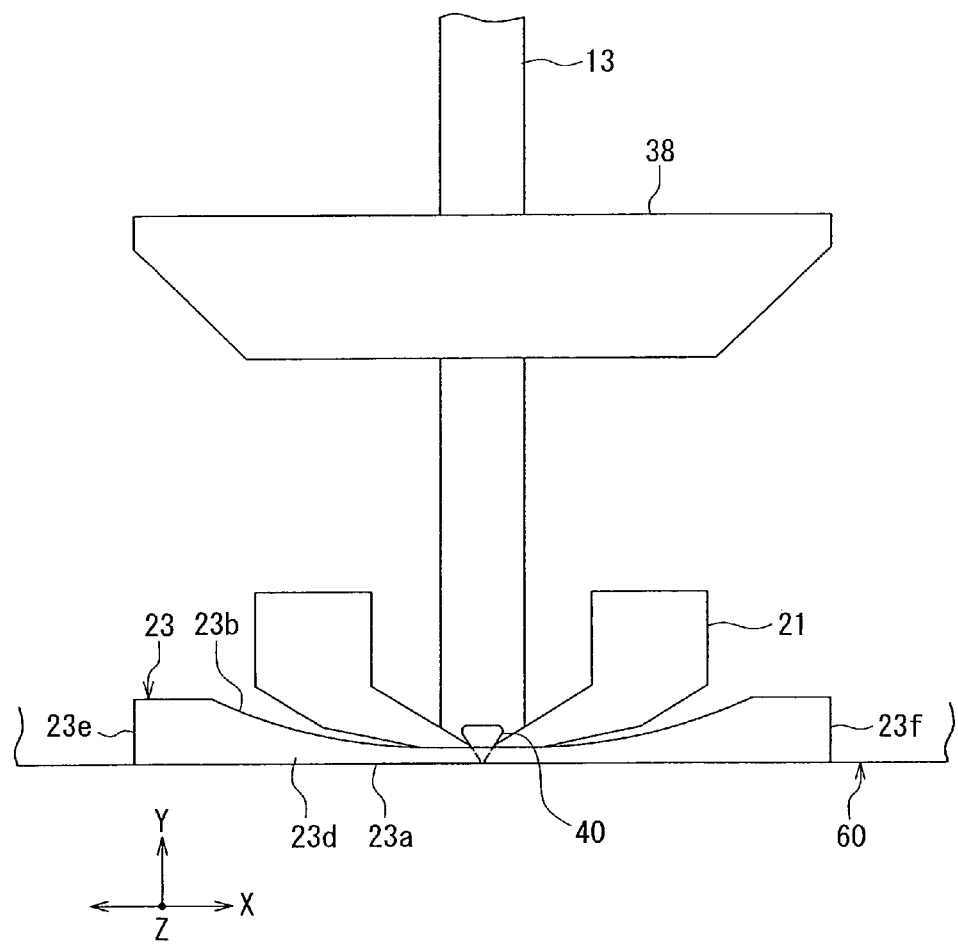
FIG. 30 is a plan view showing another part of the thermally-assisted magnetic recording head according to the fifth embodiment of the invention.

A thermally-assisted magnetic recording head according to a fifth embodiment of the invention will now be described with reference to FIG. 25 to FIG. 30. FIG. 25 is a perspective view showing the main part of the thermally-assisted magnetic recording head. FIG. 26 is a front view showing the main part of the thermally-assisted magnetic recording head. FIG. 27 is a cross-sectional view showing the configuration of the thermally-assisted magnetic recording head. FIG. 28 is a front view showing the medium facing surface of the thermally-assisted magnetic recording head. In FIG. 27 and FIG. 28, the not-shown insulating layer that has been described in relation to the second embodiment is shown with the reference numeral 11. FIG. 29 is a plan view showing a part of the thermally-assisted magnetic recording head. FIG. 30 is a plan view showing another part of the thermally-assisted magnetic recording head.

The configuration of the thermally-assisted magnetic recording head according to the present embodiment is different from that of the second embodiment in the following respects. In the thermally-assisted magnetic recording head according to the present embodiment, the core 13 has a groove 13g that opens in the evanescent light generating surface 13b. The groove 13g is formed to extend from the side surfaces 13d and 13e of the core 13 to the medium facing surface 60, and generally takes the shape of a letter Y when viewed from above, the bottom end of Y being located in the medium facing surface 60.

Further, the thermally-assisted magnetic recording head according to the present embodiment has a main pole 21 and a shield 23 in place of the main pole 19 and the shield 16 of the second embodiment. Part of the main pole 21 is accommodated in the groove 13g. The shield 23 is located on the front side in the direction of travel of the recording medium (the Z direction) relative to the core 13 and the main pole 21. The plasmon generator 40 is interposed between the shield 23 and each of the core 13 and the main pole 21.

The main pole 21 has a first end face 21a located in the medium facing surface 60, a bottom surface 21c, and a top surface 21d. The top surface 21d of the main pole 21 and the evanescent light generating surface 13b are coplanar. The main pole 21 may or may not be in contact with the core 13. In the latter case, part of the cladding may be interposed between the main pole 21 and the core 13. The main pole 21 is shaped to be greater in dimension in the track width direction (the X direction) than in dimension in the direction perpendicular to the top surface 1a of the substrate 1 (the Z direction).

The shield 23 has a second end face 23a located in the medium facing surface 60, a rear end face 23b opposite to the second end face 23a, a bottom surface 23c, a top surface 23d, and two side surfaces 23e and 23f.

The first end face 21a of the main pole 21 is located on the rear side in the direction of travel of the recording medium (the Z direction) relative to the second end face 23a of the shield 23. The near-field light generating part 40g of the plasmon generator 40 is located between the first end face 21a and the second end face 23a.

The front end face 13a of the core 13 includes a first portion 13a1 and a second portion 13a2 as in the first embodiment. In the present embodiment, the second portion 13a2 is located on opposite sides of the first end face 21a of the main pole 21 in the track width direction (the X direction) and on the rear side of the first end face 21a in the direction of travel of the recording medium (the Z direction). The first portion 13a1 is composed of a part of the wall face of the groove 13g that overlaps the first end face 21a when viewed in the direction perpendicular to the medium facing surface 60 (the Y direction). The first end portion E1 of the front end face 13a is composed of the respective forward ends of the first and second portions 13a1 and 13a2 in the direction of travel of the recording medium. The second end portion E2 of the front end face 13a is composed of the rearward end of the second portion 13a2 in the direction of travel of the recording medium.

In FIG. 26, the region from the midpoint position C between the first end portion E1 and the second end portion E2 to the first end portion E1 is the first region R1 of the front end face 13a, while the region from the midpoint position C to the second end portion E2 is the second region R2 of the front end face 13a. The main pole 21 overlaps only the first region R1 of the front end face 13a of the core 13 when viewed in the direction perpendicular to the medium facing surface 60.

The main pole 21 includes an overlapping portion 211 that is accommodated in the groove 13g of the core 13, and two non-overlapping portions 212 and 213 that are located on opposite sides of the overlapping portion 211 in the track width direction (the X direction) and not exposed in the medium facing surface 60. The overlapping portion 211 overlaps the first region R1 when viewed in the direction perpendicular to the medium facing surface 60. The two non-overlapping portions 212 and 213 are located on opposite sides of the front end face 13a of the core 13 in the track width direction when viewed in the direction perpendicular to the medium facing surface 60. Thus, the non-overlapping portions 212 and 213 do not overlap the front end face 13a. The maximum length of each of the non-overlapping portions 212 and 213 in the direction perpendicular to the medium facing surface 60 is greater than the length of the overlapping portion 211 in the same direction. The coupling layer 34 of the return path section 30 is connected to the non-overlapping portion 212. More specifically, the coupling layer 34 is in contact with a part of at least the bottom surface 21c of the outer surface of the main pole 21, the part being included in the non-overlapping portion 212. The coupling layer 35 of the return path section 30 is connected to the non-overlapping portion 213. More specifically, the coupling layer 35 is in contact with a part of at least the bottom surface 21c of the outer surface of the main pole 21, the part being included in the non-overlapping portion 213. In the present embodiment, none of the coupling layers 33 to 35 are exposed in the medium facing surface 60.

As shown in FIG. 29, the overlapping portion 211 includes first and second portions located on opposite sides of the track-widthwise center of the first region R1. The first and second portions overlap the first region R1 when viewed in the direction perpendicular to the medium facing surface 60. Each of the first and second portions has a length that is in the direction perpendicular to the medium facing surface 60 and that increases with increasing distance from the track-widthwise center of the first region R1. The overlapping portion 211 may include not only the first and second portions but also a third portion located between the first and second portions. The length of the third portion in the direction perpendicular to the medium facing surface 60 is constant regardless of position in the track width direction.

Further, the thermally-assisted magnetic recording head according to the present embodiment has a dielectric layer 22 in place of the dielectric layers 17 and 18. The dielectric layer 22 is disposed to cover the plasmon generator 40 and the cladding layer 15. The shield 23 is disposed on the dielectric layer 22. Portions of the coupling layers 36 and 37 of the return path section 30 are embedded in the dielectric layer 22. The coupling layer 38 of the return path section 30 is disposed over the coupling layers 36 and 37 and the dielectric layer 22. The dielectric layer 24 lies on the dielectric layer 22 and surrounds the shield 23 and the coupling layer 38. The coupling layer 39 of the return path section 30 has an end face located in the medium facing surface 60, lies over the shield 23, the dielectric layer 24, the insulating layer 26 and the coupling layer 38, and magnetically couples the shield 23 and the coupling layer 38 to each other. The dielectric layer 22 is made of alumina, for example.

Further, in the present embodiment, the thickness (the dimension in the Z direction) of the plasmon generator 40 gradually increases with increasing distance from the medium facing surface 60, and then becomes constant. As the plasmon generator 40 is reduced in thickness (dimension in the Z direction), the excitation efficiency of surface plasmons is decreased to cause less surface plasmons to be excited. For this reason, the plasmon generator 40 preferably has a thickness of a certain magnitude. In the present embodiment, part of the plasmon generator 40 gradually increases in thickness (dimension in the Z direction) with increasing distance from the medium facing surface 60. According to the present embodiment, this allows the front end face 40e to be small in dimension in the Z direction while allowing the plasmon generator 40 to be large in thickness in the part thereof away from the medium facing surface 60. Consequently, according to the present embodiment, it is possible to produce near-field light having a small spot diameter and sufficient intensity.

The description of the first embodiment has mentioned the problem that occurs when the bottom shield and the front end face of the core are opposed to each other over a large area. This problem would also occur when the main pole and the front end face of the core are opposed to each other over a large area. The present embodiment is configured so that the main pole 21 overlaps only the first region R1 of the front end face 13a when viewed in the direction perpendicular to the medium facing surface 60. The present embodiment thus prevents the main pole 21 and the front end face 13a of the core 13 from being opposed to each other over a large area, thereby precluding the aforementioned problem.

Further, in the present embodiment, the main pole 21 is shaped to be greater in dimension in the track width direction (the X direction) than in dimension in the direction perpendicular to the top surface 1a of the substrate (the Z direction). Consequently, even though the main pole 21 overlaps only the first region R1 of the front end face 13a, it is possible to connect the return path section 30 to at least one of two portions of main pole 21 that are opposite in the track width direction.

To preclude the aforementioned problem with higher reliability, the region of the front end face 13a that the main pole 21 overlaps when viewed in the direction perpendicular to the medium facing surface 60 may be only a region extending from a position that is closer to the first end portion E1 (excluding the first end portion E1) than is the midpoint position C to the first end portion E1. For example, the region of the front end face 13a that the main pole 21 overlaps when viewed in the direction perpendicular to the medium facing surface 60 may be only a region extending from a position that is located between the first end portion E1 and the second end portion E2 and is away from the first end portion E1 by ¼ the distance between the first end portion E1 and the second end portion E2 to the first end portion E1. The present embodiment satisfies this requirement.

The remainder of configuration, function and effects of the present embodiment are similar to those of the second embodiment.

Sixth Embodiment

Figure 31:
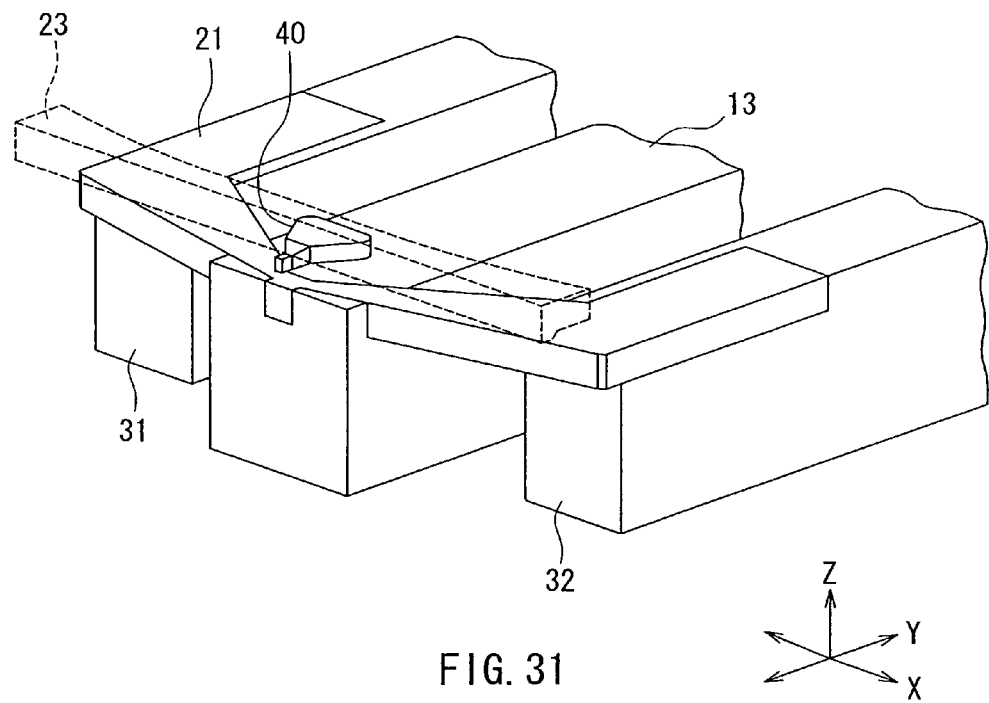
FIG. 31 is a perspective view showing the main part of a thermally-assisted magnetic recording head according to a sixth embodiment of the invention.
Figure 32:
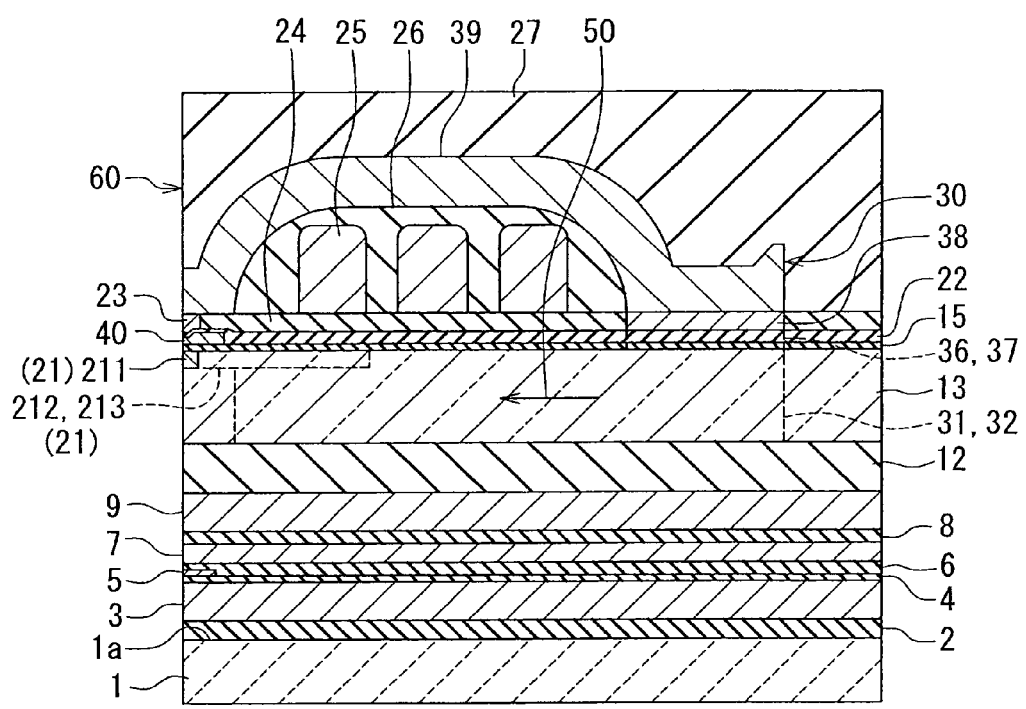
FIG. 32 is a cross-sectional view showing the configuration of the thermally-assisted magnetic recording head according to the sixth embodiment of the invention.
Figure 33:
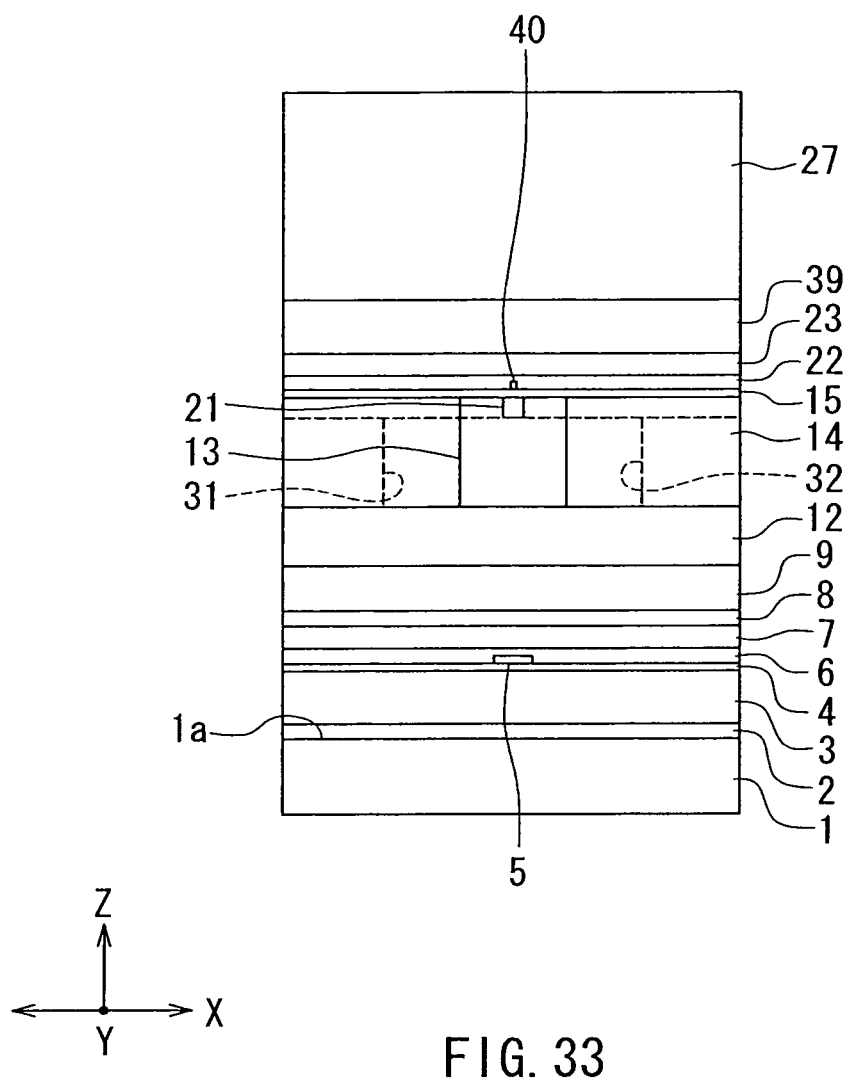
FIG. 33 is a front view showing the medium facing surface of the thermally-assisted magnetic recording head according to the sixth embodiment of the invention.
Figure 34:
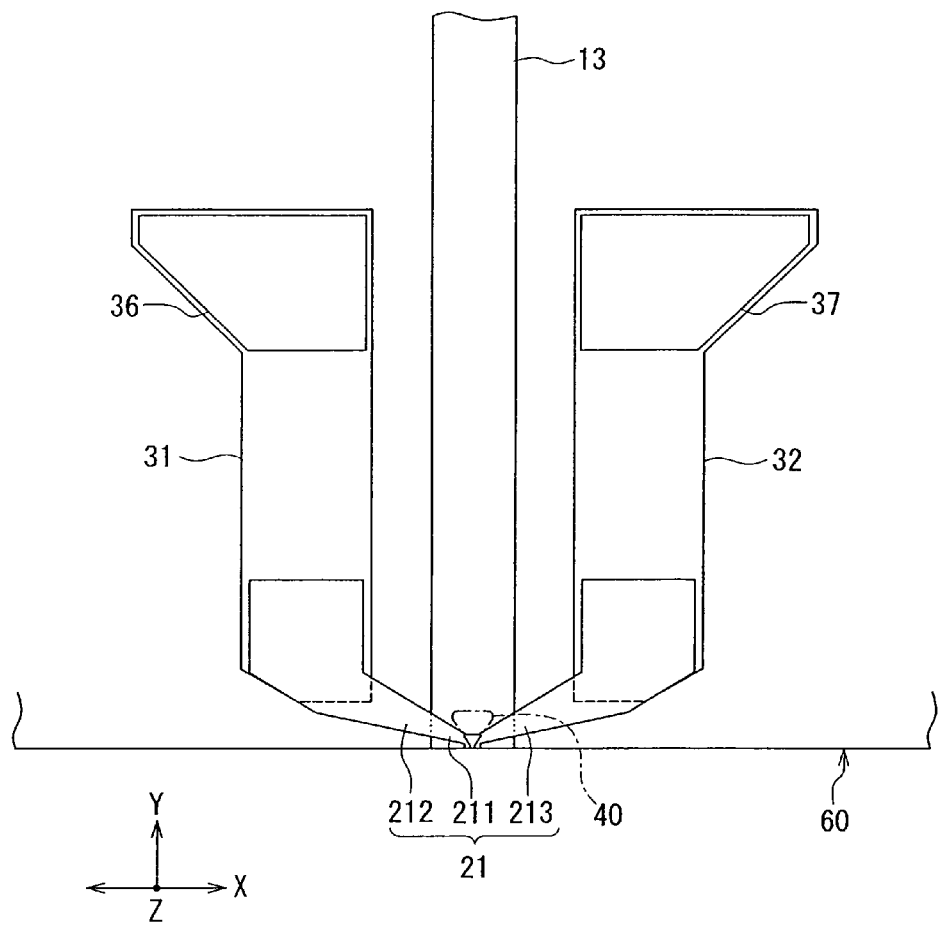
FIG. 34 is a plan view showing a part of the thermally-assisted magnetic recording head according to the sixth embodiment of the invention.

A thermally-assisted magnetic recording head according to a sixth embodiment of the invention will now be described with reference to FIG. 31 to FIG. 34. FIG. 31 is a perspective view showing the main part of the thermally-assisted magnetic recording head. FIG. 32 is a cross-sectional view showing the configuration of the thermally-assisted magnetic recording head. FIG. 33 is a front view showing the medium facing surface of the thermally-assisted magnetic recording head. FIG. 34 is a plan view showing a part of the thermally-assisted magnetic recording head.

The configuration of the thermally-assisted magnetic recording head according to the present embodiment is different from that of the fifth embodiment in the following respects. In the thermally-assisted magnetic recording head according to the present embodiment, the return path section 30 has the coupling layers 31 and 32 which have been described in relation to the first embodiment, in place of the coupling layers 33 to 35. The coupling layer 31 is connected to the non-overlapping portion 212 of the main pole 21. The coupling layer 32 is connected to the non-overlapping portion 213 of the main pole 21. In the present embodiment, neither of the coupling layers 31 and 32 is exposed in the medium facing surface 60. Further, the present embodiment is without the nonmagnetic layer 10 and the insulating layer 11 as is the first embodiment.

The remainder of configuration, function and effects of the present embodiment are similar to those of the first or fifth embodiment.

Seventh Embodiment

Figure 35:
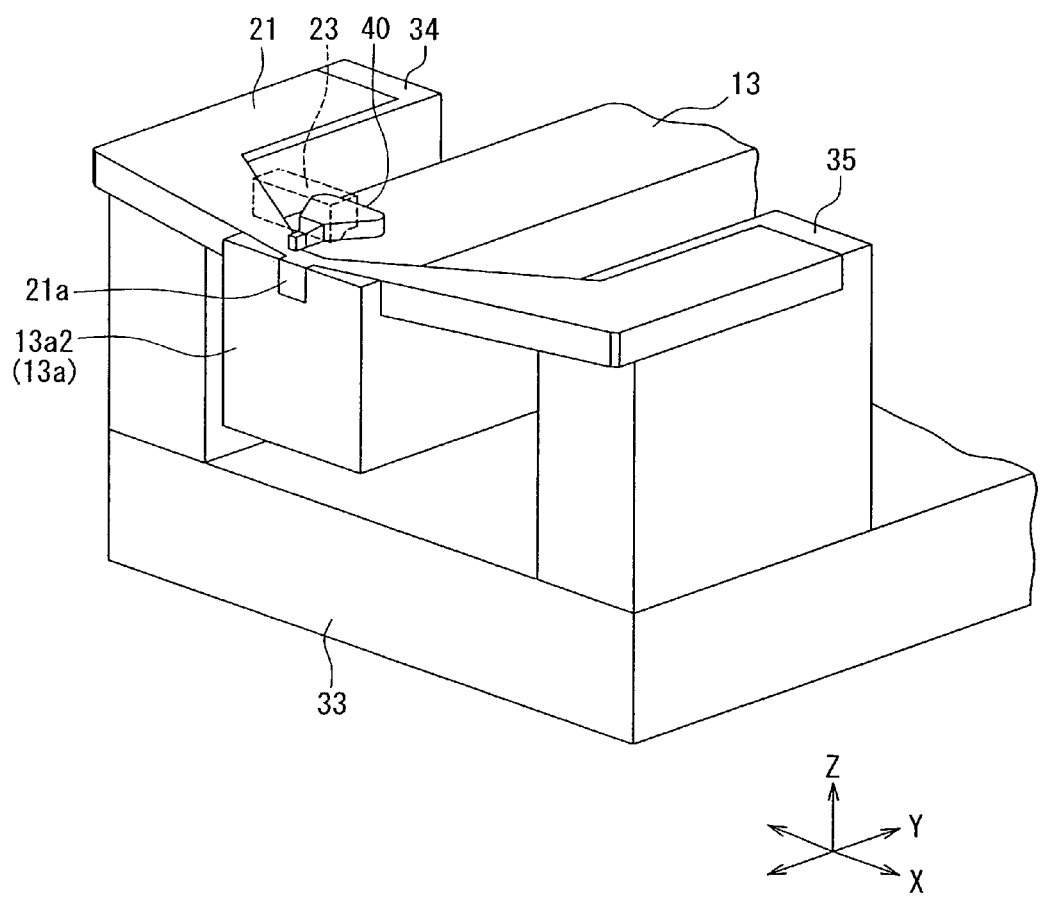
FIG. 35 is a perspective view showing the main part of a thermally-assisted magnetic recording head according to a seventh embodiment of the invention.
Figure 36:
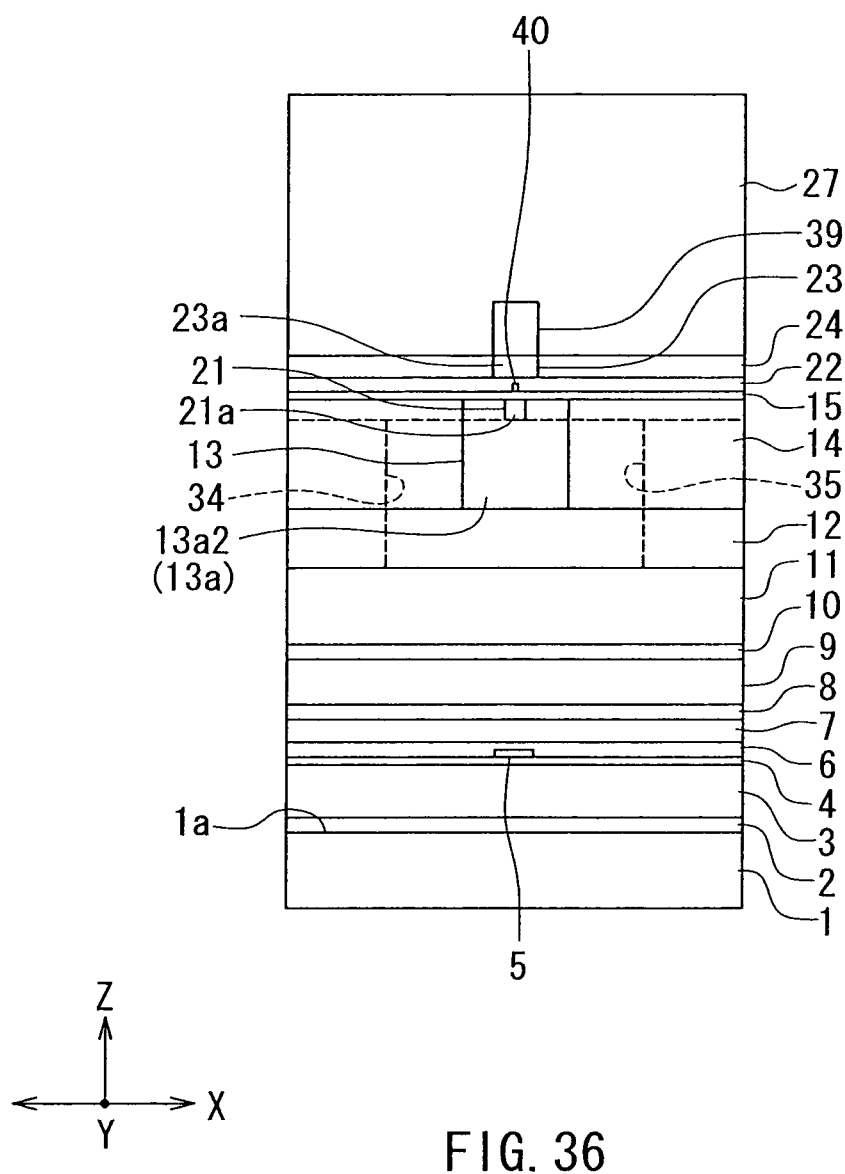
FIG. 36 is a front view showing the medium facing surface of the thermally-assisted magnetic recording head according to the seventh embodiment of the invention.
Figure 37:
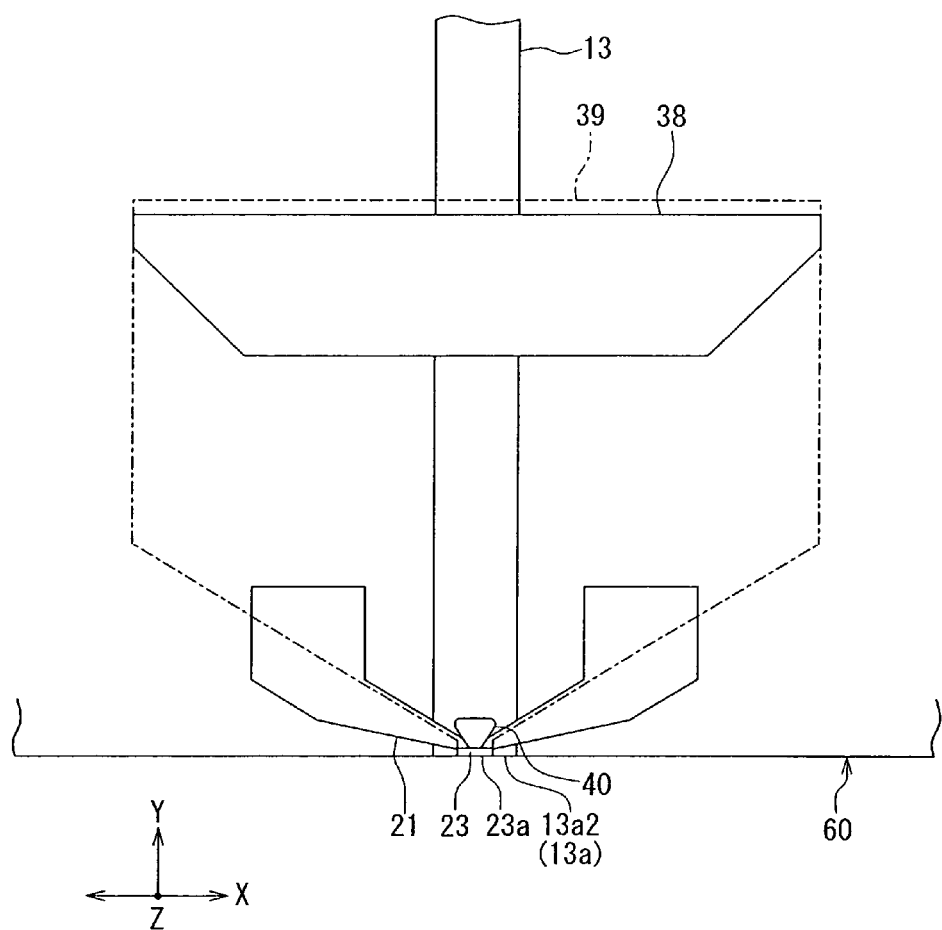
FIG. 37 is a plan view showing a part of the thermally-assisted magnetic recording head according to the seventh embodiment of the invention.

A thermally-assisted magnetic recording head according to a seventh embodiment of the invention will now be described with reference to FIG. 35 to FIG. 37. FIG. 35 is a perspective view showing the main part of the thermally-assisted magnetic recording head. FIG. 36 is a front view showing the medium facing surface of the thermally-assisted magnetic recording head. FIG. 37 is a plan view showing a part of the thermally-assisted magnetic recording head.

The configuration of the thermally-assisted magnetic recording head according to the present embodiment is different from that of the fifth embodiment in the following respects. In the thermally-assisted magnetic recording head according to the present embodiment, the width of the second end face 23a of the shield 23 in the track width direction (the X direction) is smaller than the width of the front end face 13a of the core 13 and greater than the width of the first end face 21a of the main pole 21. Further, the end face of the coupling layer 39 of the return path section 30 located in the medium facing surface 60 has a width in the track width direction (the X direction) nearly equal to the width of the second end face 23a. In the vicinity of the medium facing surface 60, the width of the coupling layer 39 in the track width direction (the X direction) is constant regardless of the distance from the medium facing surface 60, whereas in the area away from the medium facing surface 60, the aforementioned width of the coupling layer 39 is greater than that in the medium facing surface 60.

The return path section 30 of the present embodiment may have the same configuration as that in the sixth embodiment. The remainder of configuration, function and effects of the present embodiment are similar to those of the fifth or sixth embodiment.

Eighth Embodiment

Figure 38:
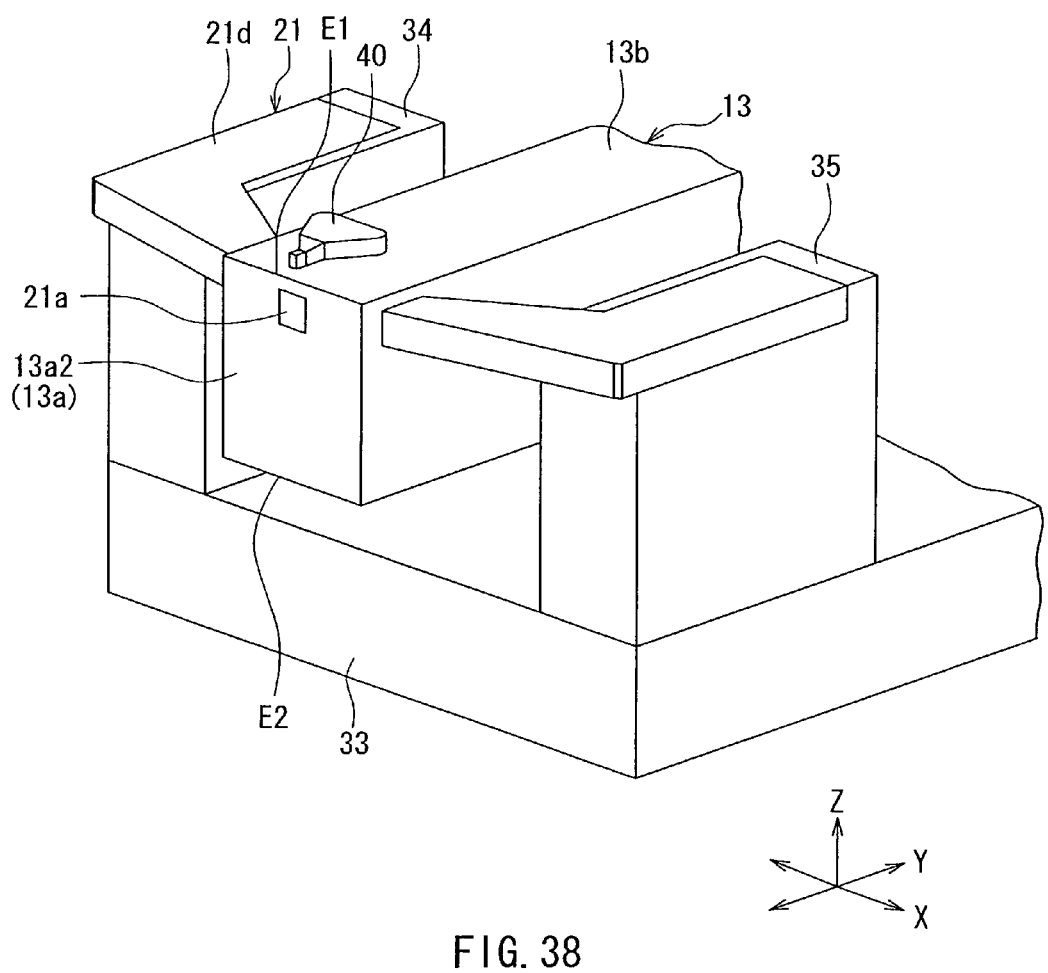
FIG. 38 is a perspective view showing the main part of a thermally-assisted magnetic recording head according to an eighth embodiment of the invention.

A thermally-assisted magnetic recording head according to an eighth embodiment of the invention will now be described with reference to FIG. 38. FIG. 38 is a perspective view showing the main part of the thermally-assisted magnetic recording head. The configuration of the thermally-assisted magnetic recording head according to the present embodiment is different from that of the fifth embodiment in the following respects. In the thermally-assisted magnetic recording head according to the present embodiment, part of the main pole 21 is embedded in the core 13 so that the top surface 21d of the main pole 21 is located on the rear side in the direction of travel of the recording medium (the Z direction) relative to the evanescent light generating surface 13b of the core 13. In the front end face 13a of the core 13, part of the second portion 13a2 is located on the front side in the direction of travel of the recording medium relative to the first end face 21a of the main pole 21. The first end portion E1 of the front end face 13a is composed of the forward end of the second portion 13a2 in the direction of travel of the recording medium.

The return path section 30 of the present embodiment may have the same configuration as that in the sixth embodiment. The shapes of the shield 23 and the coupling layer 39 of the present embodiment may be the same as those in the seventh embodiment. The remainder of configuration, function and effects of the present embodiment are similar to those of any of the fifth to seventh embodiments.

The present invention is not limited to the foregoing embodiments, and various modifications may be made thereto. For example, the main pole or the shield may have only a single non-overlapping portion. Further, as far as the requirements of the appended claims are met, the shapes and locations of the core of the waveguide, the plasmon generator, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
 a medium facing surface that faces a recording medium;
 a coil that produces a magnetic field corresponding to data to be written on the recording medium;
 a main pole having a first end face located in the medium facing surface, the main pole allowing a magnetic flux that corresponds to the magnetic field produced by the coil to pass, and producing a write magnetic field for writing the data on the recording medium by means of a perpendicular magnetic recording system;
 a shield made of a magnetic material and having a second end face located in the medium facing surface;

a return path section made of a magnetic material, the return path section allowing the magnetic flux that corresponds to the magnetic field produced by the coil to pass, and connecting the main pole and the shield to each other so that a space through which part of the coil passes is defined by the main pole, the shield, and the return path section;

a waveguide including a core through which light propagates, and a cladding disposed around the core, the core having a front end face facing toward the medium facing surface; and a plasmon generator having a near-field light generating part located in the medium facing surface, the plasmon generator being configured so that a surface plasmon is excited on the plasmon generator based on the light propagating through the core, and the near-field light generating part generates near-field light based on the surface plasmon, wherein:

the first end face and the second end face are located at positions that are different from each other in a direction of travel of the recording medium;

the near-field light generating part is located between the first end face and the second end face;

the front end face of the core has a first end portion and a second end portion that are located at opposite ends in the direction of travel of the recording medium, and the first end portion is located closer to the near-field light generating part than is the second end portion; and when the front end face of the core is divided into two regions: a first region extending from a midpoint position between the first end portion and the second end portion to the first end portion; and a second region extending from the midpoint position to the second end portion, one of the main pole and the shield overlaps only the first region of the front end face of the core when viewed in a direction perpendicular to the medium facing surface.

2. The thermally-assisted magnetic recording head according to claim 1, wherein:
one of the main pole and the shield has at least one non-overlapping portion that is located on an outward side of the front end face of the core in a track width direction when viewed in the direction perpendicular to the medium facing surface; and
the return path section is connected to the at least one non-overlapping portion.

3. The thermally-assisted magnetic recording head according to claim 2, wherein the at least one non-overlapping portion is two non-overlapping portions that are located on opposite sides of the front end face of the core in the track width direction when viewed in the direction perpendicular to the medium facing surface.

4. The thermally-assisted magnetic recording head according to claim 1, wherein:
one of the main pole and the shield has first and second portions that overlap the first region when viewed in the direction perpendicular to the medium facing surface;
the first and second portions are located on opposite sides of a track-widthwise center of the first region; and
each of the first and second portions has a length that is in the direction perpendicular to the medium facing surface and that increases with increasing distance from the track-widthwise center of the first region.

5. The thermally-assisted magnetic recording head according to claim 1, wherein the first end face and the second end face are at a distance in the range of 50 to 300 nm from each other.

6. The thermally-assisted magnetic recording head according to claim 5, wherein the distance between the first end face and the second end face is in the range of 50 to 100 nm.

7. The thermally-assisted magnetic recording head according to claim 1, wherein:
the core has an evanescent light generating surface that generates evanescent light based on the light propagating through the core;
the plasmon generator has a plasmon exciting part that faces the evanescent light generating surface with a predetermined spacing therebetween; and
in the plasmon generator, the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

8. A thermally-assisted magnetic recording head comprising:
a medium facing surface that faces a recording medium;
a coil that produces a magnetic field corresponding to data to be written on the recording medium;
a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
a waveguide including a core through which light propagates, and a cladding disposed around the core, the core having a front end face facing toward the medium facing surface; and
a plasmon generator having a near-field light generating part located in the medium facing surface, the plasmon generator being configured so that a surface plasmon is excited on the plasmon generator based on the light propagating through the core, and the near-field light generating part generates near-field light based on the surface plasmon, wherein:
the front end face of the core has a first end portion and a second end portion that are located at opposite ends in a direction of travel of the recording medium, and the first end portion is located closer to the near-field light generating part than is the second end portion;
when the front end face of the core is divided into two regions: a first region extending from a midpoint position between the first end portion and the second end portion to the first end portion; and a second region extending from the midpoint position to the second end portion, the main pole overlaps only the first region of the front end face of the core when viewed in a direction perpendicular to the medium facing surface;
the main pole has first and second portions that overlap the first region when viewed in the direction perpendicular to the medium facing surface;
the first and second portions are located on opposite sides of a track-widthwise center of the first region; and
each of the first and second portions has a length that is in the direction perpendicular to the medium facing surface and that increases with increasing distance from the track-widthwise center of the first region.

9. A thermally-assisted magnetic recording head comprising:
a medium facing surface that faces a recording medium;
a coil that produces a magnetic field corresponding to data to be written on the recording medium;

a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;

a waveguide including a core through which light propagates, and a cladding disposed around the core, the core having a front end face facing toward the medium facing surface; and a plasmon generator having a near-field light generating part located in the medium facing surface, the plasmon generator being configured so that a surface plasmon is excited on the plasmon generator based on the light propagating through the core, and the near-field light generating part generates near-field light based on the surface plasmon, wherein:

the front end face of the core has a first end portion and a second end portion that are located at opposite ends in a direction of travel of the recording medium, and the first end portion is located closer to the near-field light generating part than is the second end portion;

when the front end face of the core is divided into two regions: a first region extending from a midpoint position between the first end portion and the second end portion to the first end portion; and a second region extending from the midpoint position to the second end portion, the main pole overlaps only the first region of the front end face of the core when viewed in a direction perpendicular to the medium facing surface;

the core has an evanescent light generating surface that generates evanescent light based on the light propagating through the core;

the plasmon generator has a plasmon exciting part that faces the evanescent light generating surface with a predetermined spacing therebetween; and in the plasmon generator, the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

\* \* \* \* \*